US012568511B2

(12) United States Patent　　　(10) Patent No.: US 12,568,511 B2
Liu et al.　　　　　　　　　　　　(45) Date of Patent: Mar. 3, 2026

(54) USER EQUIPMENTS, BASE STATIONS, AND METHODS

(71) Applicant: SHARP KABUSHIKI KAISHA, Osaka (JP)

(72) Inventors: Liqing Liu, Osaka (JP); Shohei Yamada, Osaka (JP); Hiroki Takahashi, Osaka (JP); Meng Cheng, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 322 days.

(21) Appl. No.: 18/273,246

(22) PCT Filed: Mar. 11, 2022

(86) PCT No.: PCT/JP2022/012488
§ 371 (c)(1),
(2) Date: Jul. 19, 2023

(87) PCT Pub. No.: WO2022/196789
PCT Pub. Date: Sep. 22, 2022

(65) Prior Publication Data
US 2024/0114521 A1　　Apr. 4, 2024

(30) Foreign Application Priority Data

Mar. 17, 2021　(JP) ................................. 2021-043646

(51) Int. Cl.
*H04W 72/232* (2023.01)
*H04L 5/00* (2006.01)
(Continued)

(52) U.S. Cl.
CPC ......... *H04W 72/232* (2023.01); *H04L 5/0051* (2013.01); *H04W 72/1273* (2013.01); *H04W 76/20* (2018.02)

(58) Field of Classification Search
CPC ......... H04B 7/0695; H04B 7/088; H04L 1/08; H04L 1/1812; H04L 1/1854;
(Continued)

(56) References Cited

U.S. PATENT DOCUMENTS

| | | | | |
|---|---|---|---|---|
| 2020/0229156 A1* | 7/2020 | Park | ...................... | H04W 72/23 |
| 2022/0256566 A1* | 8/2022 | Gao | .......................... | H04L 1/08 |
| 2022/0400505 A1* | 12/2022 | Matsumura | ....... | H04W 72/1273 |

FOREIGN PATENT DOCUMENTS

| | | | | | |
|---|---|---|---|---|---|
| CN | 114223140 A | * | 3/2022 | ............ | H04W 72/23 |

OTHER PUBLICATIONS

"3GPP TS 38.523-3 version 15.1.0 Release 15". ETSI Technical Specification, Oct. 2018. (Year: 2018).*
(Continued)

*Primary Examiner* — Christopher Biagini
(74) *Attorney, Agent, or Firm* — ScienBiziP, P.C.

(57) ABSTRACT

A method by a user equipment (UE) is described. The method includes receiving, from a base station, a first radio resource control (RRC) parameter including one or more entries, wherein each entry at least provides a value for 'number of DMRS CDM groups without data' and one value for one DMRS port index among one or more DMRS port indexes; and determining a bitwidth of an antenna port field in a DCI format at least based on a total count of the one or more entries included in the first RRC parameter; and receiving the DCI format with the antenna port field, wherein a value of the antenna port field indicates one of the one or more entries; and receiving a PDSCH scheduled by the DCI format based on the value of the 'number of DMRS CDM groups without data' and the DMRS port index associated to an entry corresponding to a value indicated in the antenna port field.

5 Claims, 13 Drawing Sheets

(51) Int. Cl.
    *H04W 72/1273*     (2023.01)
    *H04W 76/20*     (2018.01)

(58) Field of Classification Search
    CPC ..... H04L 1/1861; H04L 5/001; H04L 5/0023;
        H04L 5/0044; H04L 5/0048; H04L 5/005;
            H04L 5/0051; H04L 5/0053; H04L
            5/0055; H04L 5/0094; H04W 72/0446;
            H04W 72/1273; H04W 72/21; H04W
            72/23; H04W 72/232; H04W 74/0833;
                H04W 74/0838; H04W 76/20
    See application file for complete search history.

(56)                 References Cited

OTHER PUBLICATIONS

Huawei, "Introduction of power saving in 38.212", R1-1913658, 3GPP TSG-RAN WG1 Meeting #99, Reno, USA, Nov. 18-22, 2019.

* cited by examiner

Figure 4:
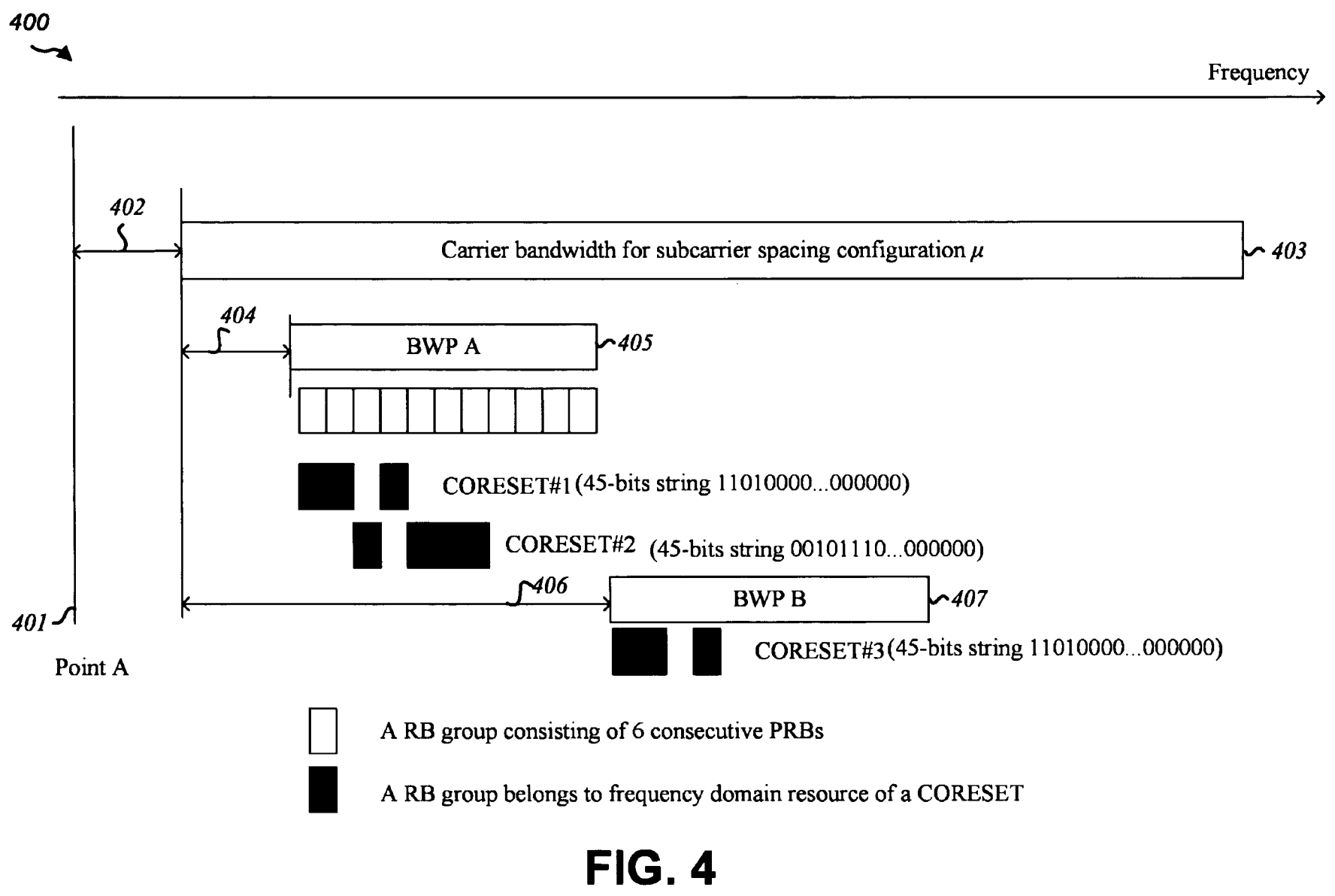

Frequency

Carrier bandwidth for subcarrier spacing configuration $\mu$

*403*

BWP A

*405*

CORESET#1 (45-bits string 11010000...000000)

CORESET#2 (45-bits string 00101110...000000)

*406*

BWP B

*407*

CORESET#3 (45-bits string 11010000...000000)

*404*

*402*

Point A

*401*

*400*

A RB group consisting of 6 consecutive PRBs

A RB group belongs to frequency domain resource of a CORESET

| Value | Number of DMRS CDM group(s) without data | DMRS port(s) |
|---|---|---|
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 2 | 0,2 |
| 12-15 | Reserved | Reserved |

FIG. 9

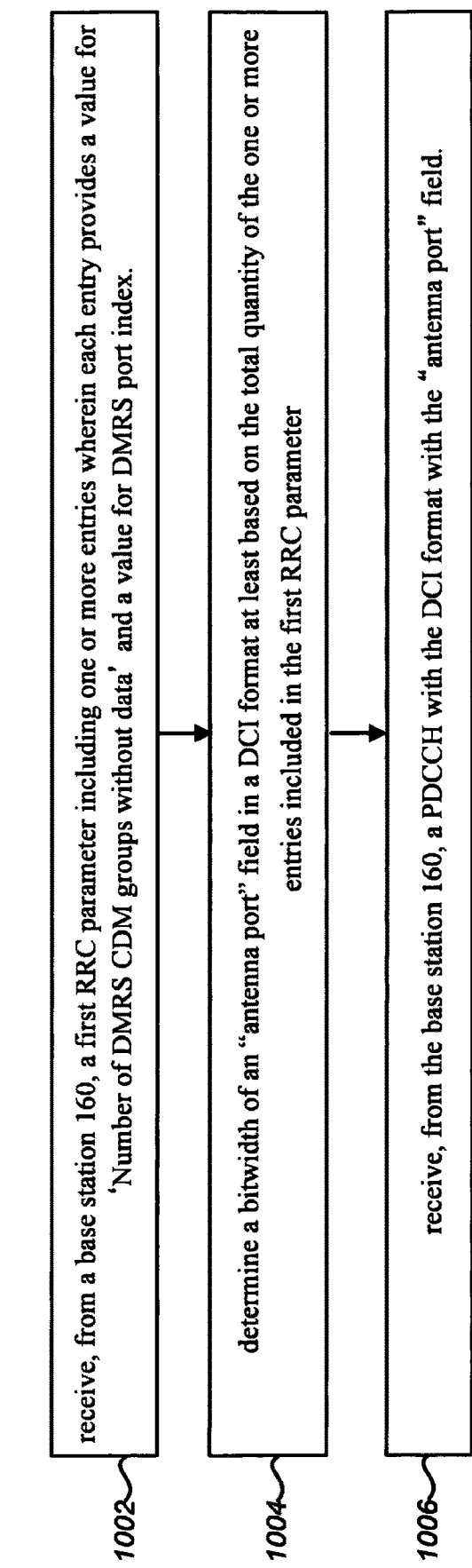

1000

1002  receive, from a base station 160, a first RRC parameter including one or more entries wherein each entry provides a value for 'Number of DMRS CDM groups without data' and a value for DMRS port index.

1004  determine a bitwidth of an "antenna port" field in a DCI format at least based on the total quantity of the one or more entries included in the first RRC parameter 1006  receive, from the base station 160, a PDCCH with the DCI format with the "antenna port" field.

FIG. 10

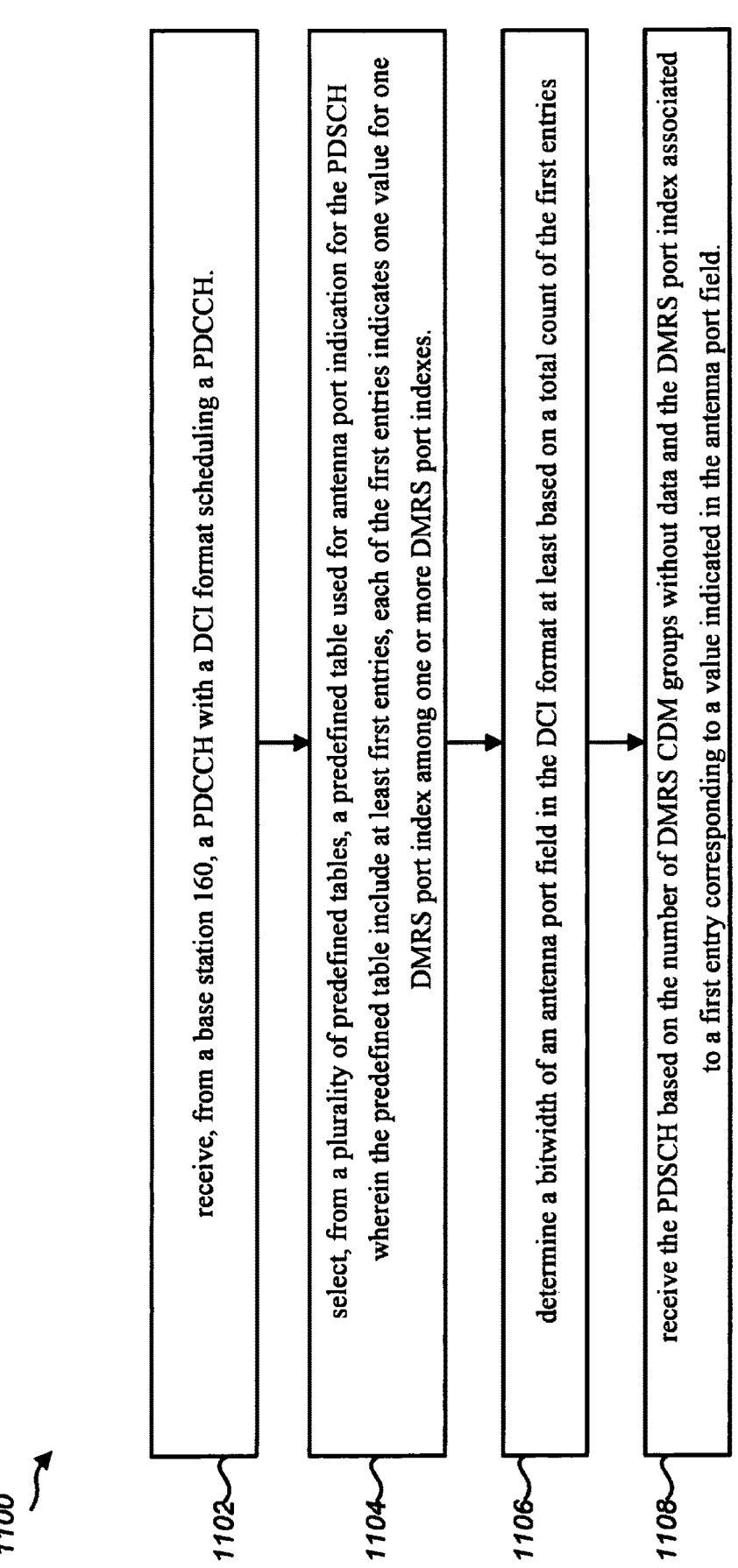

1102 — receive, from a base station 160, a PDCCH with a DCI format scheduling a PDCCH.

1104 — select, from a plurality of predefined tables, a predefined table used for antenna port indication for the PDSCH wherein the predefined table include at least first entries, each of the first entries indicates one value for one DMRS port index among one or more DMRS port indexes.

1106 — determine a bitwidth of an antenna port field in the DCI format at least based on a total count of the first entries 1108 — receive the PDSCH based on the number of DMRS CDM groups without data and the DMRS port index associated to a first entry corresponding to a value indicated in the antenna port field.

USER EQUIPMENTS, BASE STATIONS, AND METHODS

TECHNICAL FIELD

The present disclosure relates to a user equipment, a base station and a method.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. For some device types, a lower complexity would be required such as to reduce the Rx/Tx antennas, maximum number of MIMO layers, and/or the RF bandwidth to reduce the UE complexity and the UE cost. However, given the reduced features, the DL/UL channel coverage and the reception/transmission reliability would be affected and cause an inefficient communication. As illustrated by this discussion, systems and methods according to the prevent invention, supporting DCI field size reduction, may improve reception/transmission reliability and coverage, and provide the communication flexibility and efficiency.

BRIEF DESCRIPTION OF THE DRAWINGS

FIG. 4 is a diagram illustrating one 400 example of CORESET configuration in a BWP by a UE 102 and a base station 160;

FIG. 9 is a diagram illustrating one example of one predefined antenna port table 900;

FIG. 10 is a flow diagram illustrating one implementation of a method 1000 for determining bitwidth of the antenna port field by a UE 102;

FIG. 11 is a flow diagram illustrating another implementation of a method 1100 for determining bitwidth of the antenna port field by a UE 102;

DESCRIPTION OF EMBODIMENTS

Figure 1:
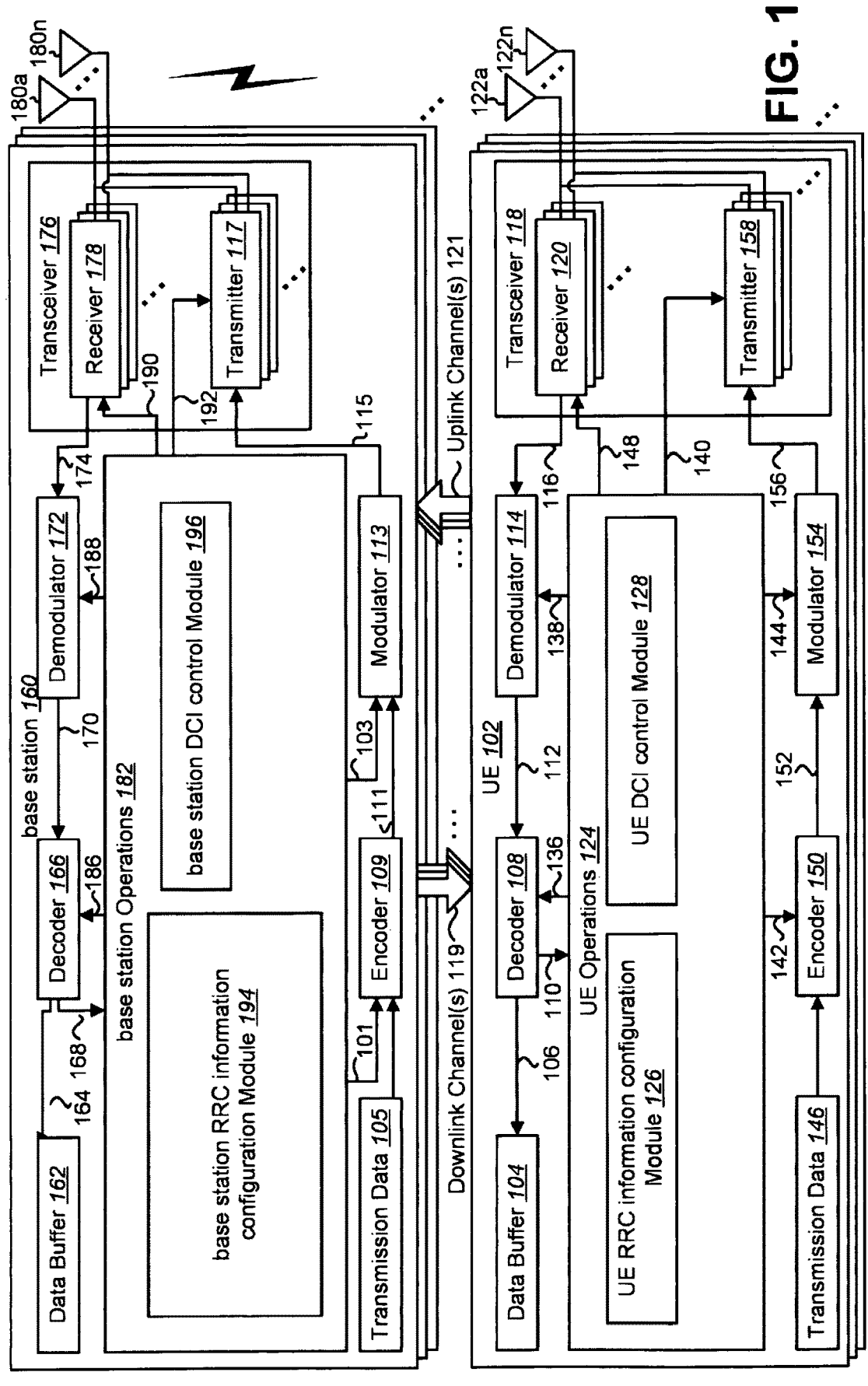
FIG. 1 is a block diagram illustrating one configuration of one or more base stations and one or more user equipments (UEs) in which systems and methods for DCI field size reduction may be implemented.

A method by a user equipment (UIE) is described. The method includes receiving, from a base station, a first radio resource control (RRC) parameter including one or more entries, wherein each entry at least provides a value for 'number of DMRS CDM groups without data' and one value for one DMRS port index among one or more DMRS port indexes; and determining a bitwidth of an antenna port field in a DCI format at least based on a total count of the one or more entries included in the first RRC parameter; and receiving the DCI format with the antenna port field, wherein a value of the antenna port field indicates one of the one or more entries; and receiving a PDSCH scheduled by the DCI format based on the value of the 'number of DMRS CDM groups without data' and the DMRS port index associated to an entry corresponding to a value indicated in the antenna port field.

A method by a base station is described. The method includes transmitting, to a user equipment (UE), transmitting, to a user equipment (UE), a first radio resource control (RRC) parameter including one or more entries, wherein each entry at least provides a value for 'number of DMRS CDM groups without data' and one value for one DMRS port index among one or more DMRS port indexes; and determining a bitwidth of an antenna port field in a DCI format at least based on a total count of the one or more entries included in the first RRC parameter; and transmitting the DCI format with the antenna port field, and a value of the antenna port field indicates one of the one or more entries; and transmitting a PDSCH scheduled by the DCI format based on the value of the 'number of DMRS CDM groups without data' and the DMRS port index associated to an entry corresponding to a value indicated in the antenna port field.

A user equipment (UE) is described. The UE includes reception circuitry configured to receive, from a base station, a first radio resource control (RRC) parameter including one or more entries, wherein each entry at least provides a value for 'number of DMRS CDM groups without data' and one value for one DMRS port index among one or more DMRS port indexes; and control circuitry configured to determine a bitwidth of an antenna port field in a DCI format at least based on a total count of the one or more entries included in the first RRC parameter, wherein the reception circuitry is further configured to receive the DCI format with the antenna port field, and a value of the antenna port field indicates one of the one or more entries, and to receive a PDSCH scheduled by the DCI format based on the value of the 'number of DMRS CDM groups without data' and the DMRS port index associated to an entry corresponding to a value indicated in the antenna port field.

A base station is described. The base station includes transmission circuitry configured to transmit, to a user equipment (UE), a first radio resource control (RRC) parameter including one or more entries, wherein each entry at least provides a value for 'number of DMRS CDM groups without data' and one value for one DMRS port index among one or more DMRS port indexes; and control circuitry configured to determine a bitwidth of an antenna port field in a DCI format at least based on a total count of the one or more entries included in the first RRC parameter, wherein the transmission circuitry is further configured to transmit the DCI format with the antenna port field, and a value of the antenna port field indicates one of the one or more entries, and to transmit a PDSCH scheduled by the DCI format based on the value of the 'number of DMRS CDM groups without data' and the DMRS port index associated to an entry corresponding to a value indicated in the antenna port field.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation—Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, 15, and/or 16, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a terminal apparatus, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE", "terminal apparatus" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G—core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:

Broadcast of System Information related to Access Stratum (AS) and Non Access Stratum (NAS);

Paging initiated by CN or RAN;

Establishment, maintenance and release of an RRC connection between the UE and NR RAN including:

Addition, modification and release of carrier aggregation;

Addition, modification and release of Dual Connectivity in NR or between LTE and NR;

Security functions including key management;

Establishment, configuration, maintenance and release of signaling radio bearers and data radio bearers;

Mobility functions including:

Handover;

UE cell selection and reselection and control of cell selection and reselection;

Context transfer at handover.

QoS management functions;

UE measurement reporting and control of the reporting;

NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:

C (Cell)-RNTI: unique UE identification used as an identifier of the RRC Connection and for scheduling;

CS (Configured Scheduling)-RNTI: unique UE identification used for Semi-Persistent Scheduling in the downlink;

INT-RNTI: identification of pre-emption in the downlink;

P-RNTI: identification of Paging and System Information change notification in the downlink;

SI-RNTI: identification of Broadcast and System Information in the downlink;

SP-CSI-RNTI: unique UE identification used for semi-persistent CSI reporting on PUSCH;

CI-RNTI: Cancellation Indication RNTI for Uplink.

For power and slot format control, the following identities are used:

SFI-RNTI: identification of slot format;

TPC-PUCCH-RNTI: unique UE identification to control the power of PUCCH;

TPC-PUSCH-RNTI: unique UE identification to control the power of PUSCH;

TPC-SRS-RNTI: unique UE identification to control the power of SRS;

During the random access procedure, the following identities are also used:

RA-RNTI: identification of the Random Access Response in the downlink;

Temporary C-RNTI: UE identification temporarily used for scheduling during the random access procedure;

Random value for contention resolution: UE identification temporarily used for contention resolution purposes during the random access procedure.

For NR connected to 5GC, the following UE identities are used at NG-RAN level:

I-RNTI: used to identify the UE context in RRC_INACTIVE.

The size of various fields in the time domain is expressed in time units $T_c=1/(\Delta f_{max}\times N_f)$ where $\Delta f_{max}=480\times10^3$ Hz and $N_f=4096$. The constant $\kappa=T_s/T_c=64$ where $T_s=1/(\Delta f_{ref}\cdot N_{f,ref})$ $\Delta f_{ref}=15\cdot10^3$ HZ and $N_{f,ref}=2048$.

Multiple OFDM numerologies are supported as given by Table 4.2-1 of [TS 38.211] where $\mu$ and the cyclic prefix for a bandwidth part are obtained from the higher-layer parameter subcarrierSpacing and cyclicPrefix, respectively.

The size of various fields in the time domain may be expressed as a number of time units $T_c=1/(15000\times2048)$ seconds. Downlink and uplink transmissions are organized into frames with $T_f=(\Delta f_{max}N_f/100)\cdot T_c=10$ ms duration, each consisting of ten subframes of $T_{sf}=(\Delta f_{max}N_f/1000)\cdot T_c=1$ ms duration. The number of consecutive OFDM symbols per subframe is $N_{symb}^{subframe,\mu}=N_{symb}^{slot}N_{slot}^{subframe\mu}$. Each frame is divided into two equally-sized half-frames of five subframes each with half-frame 0 consisting of subframes 0-4 and half-frame 1 consisting of subframes 5-9.

For subcarrier spacing (SCS) configuration u, slots are numbered $n_s^\mu\in\{0, \ldots, N_{slot}^{subframe\mu}\}$ in increasing order within a subframe and $n_{s,f}^\mu\in\{0, \ldots, N_{slot}^{frame\mu}-1\}$ in increasing order within a frame. $N_{slot}^{subframe,\mu}$ is the number of slots per subframe for subcarrier spacing configuration $\mu$. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^\mu$ in a subframe is aligned in time with the start of OFDM symbol $n_s^\mu N_{symb}^{slot}$ in the same subframe. Subcarrier spacing refers to a spacing (or frequency bandwidth) between two consecutive subcarrier in the frequency domain. For example, the subcarrier spacing can be set to 15 kHz (i.e. $\mu=0$), 30 kHz (i.e. $\mu=1$), 60 kHz (i.e. $\mu=2$), 120 kHz (i.e.

$\mu=3$), or 240 kHz (i.e. $\mu=4$). A resource block is defined as a number of consecutive subcarriers (e.g. 12) in the frequency domain. For a carrier with different frequency, the applicable subcarrier may be different. For example, for a carrier in a frequency range 1, a subcarrier spacing only among a set of {15 kHz, 30 kHz, 60 kHz} is applicable. For a carrier in a frequency range 2, a subcarrier spacing only among a set of {60 kHz, 120 kHz, 240 kHz} is applicable. The base station may not configure an inapplicable subcarrier spacing for a carrier.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for DCI field size reduction may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI) on PDCCH includes downlink assignment and uplink scheduling grants. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE DCI control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process RRC parameter for random access configurations. The UE DCI control module (processing module) 128 may determine a bitwidth of an antenna port field in a DCI format based on the processing output (e.g. a total count of one or more entries included in a first RRC parameter transmitted by the base station) from the UE RRC information configuration module 126. The UE DCI control module (processing module) 128 may select, from a plurality of predefined tables, a predefined table used for antenna port indication for reception of a PDSCH. The UE DCI control module (processing module) 128 may determine a bitwidth of an antenna port field in a DCI format based on the processing output (e.g. a total count of first entries included in a selected predefined table) from the UE RRC information configuration module 126.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station DCI control module 196 (or a base station DCI processing module 196). The base station operations module 182 may include PHY entities, MAC entities, RLC entities, PDCP entities, and an RRC entity.

The base station RRC information configuration module 194 may determine, for respective UE, a first RRC parameter including one or more entries wherein each entry at least provides a value of number of DMRS CDM groups without data and one value for DMRS port index among one or more DMRS port indexes. The base station RRC information configuration module 194 may then input the information to the base station DCI control module 196. The base station DCI control module 196 may determine, for a UE, a bitwidth of antenna port field in a DCI format based on the based on the processing output (e.g. a total count of one or more entries included in a first RRC parameter transmitted by the base station) from the base station RRC information configuration module 194. The base station DCI control module 196 may then generate a DCI format with the antenna port field. The base station DCI control module 196 may select, from a plurality of predefined tables, a predefined table used for antenna port indication for reception of a PDSCH. The base station DCI control module (processing module) 196 may determine a bitwidth of an antenna port field in a DCI format based on the processing output (e.g. a total count of first entries included in a selected predefined table) from the base station RRC information configuration module 196.

The base station operations module 182 may provide the benefit of performing PDCCH candidate search and monitoring efficiently.

The base station operations module 182 may provide information 190 to the one or more receivers 178. For example, the base station operations module 182 may inform the receiver(s) 178 when or when not to receive transmissions based on the RRC message (e.g., broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'.

Figure 2:
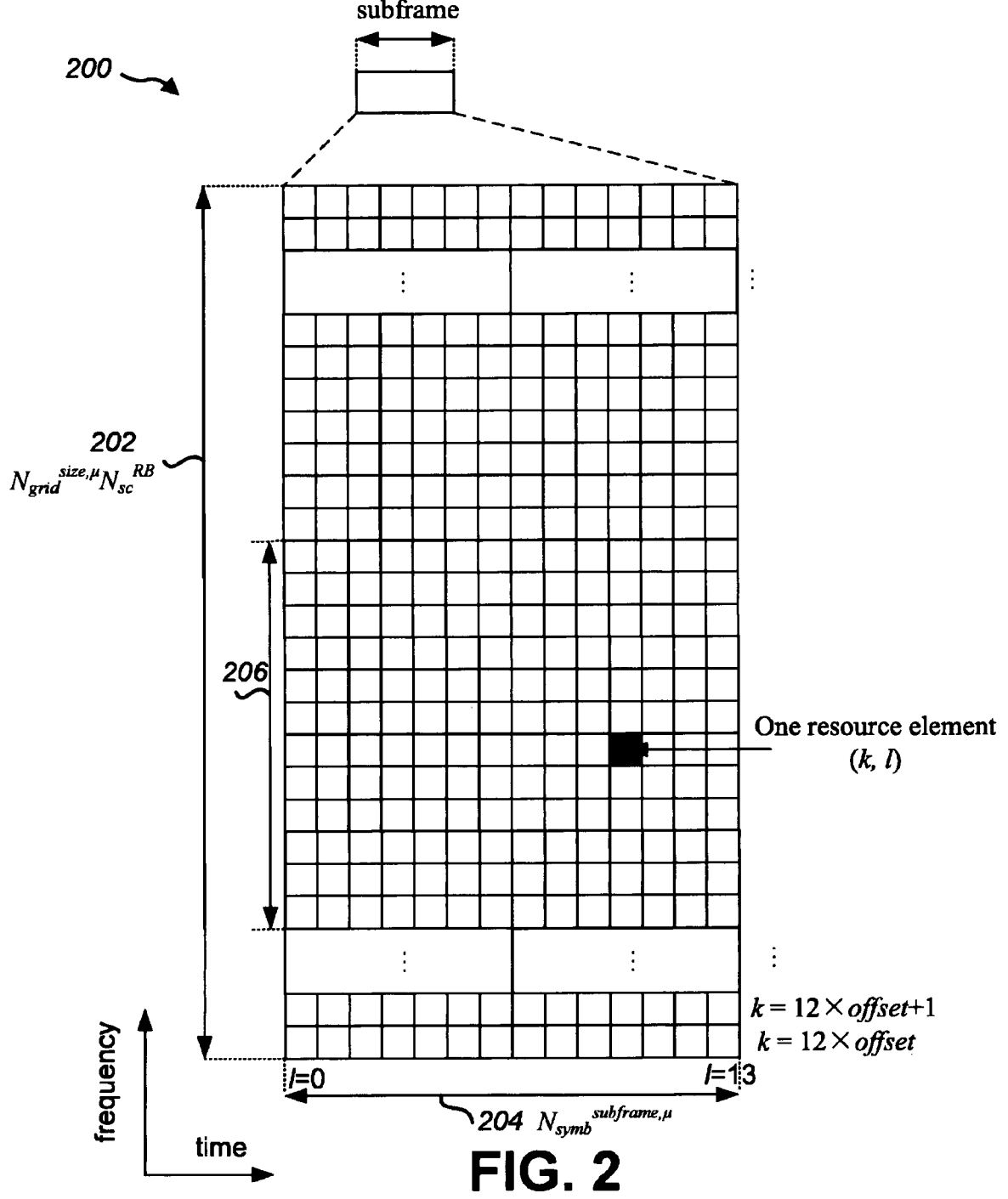
FIG. 2 is a diagram illustrating one example 200 of a resource grid.

FIG. 2 is a diagram illustrating one example of a resource grid 200.

For each numerology and carrier, a resource grid of $N_{grid,x}^{size,\mu}N_{sc}^{RB}$ subcarriers and $N_{symb}^{subframe,\mu}$ OFDM symbols is defined, starting at common resource block $N_{grid}^{start,\mu}$ indicated by higher layer signaling. There is one set of resource grids per transmission direction (uplink or downlink) with the subscript x set to DL and UL for downlink and uplink, respectively. There is one resource grid for a given antenna port p, subcarrier spacing configuration p, and the transmission direction (downlink or uplink). When there is no risk for confusion, the subscript x may be dropped.

In the FIG. 2, the resource gird 200 includes the $N_{grid,x}^{size,\mu}N_{sc}^{RB}$ (202) subcarriers in the frequency domain and includes $N_{symb}^{subframe,\ \mu}$ (204) symbols in the time domain. In the FIG. 2, as an example for illustration, the subcarrier spacing configuration μ is set to 0. That is, in the FIG. 2, the number of consecutive OFDM symbols $N_{symb}^{subframe,\mu}$ (204) per subframe is equal to 14.

The carrier bandwidth $N_{grid}^{size,\mu}$ ($N_{grid,x}^{size,\mu}$) for subcarrier spacing configuration μ is given by the higher-layer (RRC) parameter carrierBandwidth in the SCS-SpecificCarrier IE. The starting position $N_{grid}^{start,\mu}$ for subcarrier spacing configuration μ is given by the higher-layer parameter offsetToCarrier in the SCS-SpecificCarrier IE. The frequency location of a subcarrier refers to the center frequency of that subcarrier.

In the FIG. 2, for example, a value of offset is provided by the higher-layer parameter offsetToCarrier That is, k=12× offset is the lowest usable subcarrier on this carrier.

Each element in the resource grid for antenna port p and subcarrier spacing configuration μ is called a resource element and is uniquely identified by $(k, l)_{p,\mu}$ where k is the index in the frequency domain and l refers to the symbols position in the time domain relative to same reference point. The resource element consists of one subcarrier during one OFDM symbol.

A resource block is defined as $N_{sc}^{RB}=12$ consecutive subcarriers in the frequency domain. As shown in the FIG. 2, a resource block 206 includes 12 consecutive subcarriers in the frequency domain. Resource block can be classified as common resource block (CRB) and physical resource block (PRB).

Common resource blocks are numbered from 0 and upwards in the frequency domain for subcarrier spacing configuration μ. The center of subcarrier 0 of common resource block with index 0 (i.e. CRB0) for subcarrier spacing configuration μ coincides with point A. The relation between the common resource block number $n_{CRB}^{\mu}$ in the frequency domain and resource element (k, l) for subcarrier spacing configuration μ is given by Formula (1) $n_{CRB}^{\mu}=floor$ $(k/N_{sc}^{RB})$ where k is defined relative to the point A such that k=0 corresponds to the subcarrier centered around the point A. The function floor(A) hereinafter is to output a maximum integer not larger than the A.

Point A refers to as a common reference point. Point A coincides with subcarrier 0 (i.e. k=0) of a CRB 0 for all subcarrier spacing. Point A can be obtained from a RRC parameter offsetToPointA or a RRC parameter absoluteFrequencyPointA. The RRC parameter offsetToPointA is used for a PCell downlink and represents the frequency offset between point A and the lowest subcarrier of the lowest resource block, which has the subcarrier spacing provided by a higher-layer parameter subCarrierSpacingCommon and overlaps with the SS/PBCH block used by the UE for initial cell selection, expressed in units of resource blocks assuming 15 kHz subcarrier spacing for frequency range (FR) 1 and 60 kHz subcarrier spacing for frequency range (FR2). The RRC parameter absoluteFrequencyPointA is used for all cased other than the PCell case and represents the frequency-location of point A expressed as in ARFCN. The frequency location of point A can be the lowest subcarrier of the carrier bandwidth (or the actual carrier). Additionally, point A may be located outside the carrier bandwidth (or the actual carrier).

As above mentioned, the information element (IE) SCS-SpecificCarrier provides parameters determining the location and width of the carrier bandwidth or the actual carrier. That is, a carrier (or a carrier bandwidth, or an actual carrier) is determined (identified, or defined) at least by a RRC parameter offsetToCarrier, a RRC parameter subcarrier-Spacing, and a RRC parameter carrierBandwidth in the SCS-SpecificCarrier IE.

The subcarrierSpacing indicates (or defines) a subcarrier spacing of the carrier. The offsetToCarrier indicates an offset in frequency domain between point A and a lowest usable subcarrier on this carrier in number of resource blocks (e.g. CRBs) using the subcarrier spacing defined for the carrier.

The carrierBandwidth indicates width of this carrier in number of resource blocks (e.g. CRBs or PRBs) using the subcarrier spacing defined for the carrier. A carrier includes at most 275 resource blocks.

Physical resource block for subcarrier spacing configuration $\mu$ are defined within a bandwidth part and numbered form 0 to $N_{BWP,i}^{size,\mu}$ where i is the number of the bandwidth part. The relation between the physical resource block $n_{PRB}^{\mu}$ in bandwidth part (BWP) i and the common resource block $n_{CRB}^{\mu}$ is given by Formula (2) $n_{CRB}^{\mu}=n_{PRB}^{\mu}+N_{BWP,i}^{start,\mu}$ where $N_{BWP,i}^{start,\mu}$ is the common resource block where bandwidth part i starts relative to common resource block 0 (CRB0). When there is no risk for confusion the index u may be dropped.

A BWP is a subset of contiguous common resource block for a given subcarrier spacing configuration $\mu$ on a given carrier. To be specific, a BWP can be identified (or defined) at least by a subcarrier spacing u indicated by the RRC parameter subcarrierSpacing, a cyclic prefix determined by the RRC parameter cyclicPrefix, a frequency domain location, a bandwidth, an BWP index indicated by bwp-Id and so on. The locationAndBandwidth can be used to indicate the frequency domain location and bandwidth of a BWP. The value indicated by the locationAndBandwidth is interpreted as resource indicator value (RIV) corresponding to an offset (an starting resource block) $RB_{start}$ and a length $L_{RB}$ in terms of contiguously resource blocks. The offset $RB_{start}$ is a number of CRBs between the lowest CRB of the carrier and the lowest CRB of the BWP. The $N_{BWP,i}^{start,\mu}$ is given as Formula (3) $N_{BWP,i}^{start,\mu}=O_{carrier}+RB_{start}$. The value of $O_{carrier}$ is provided by offsetTocarrier for the corresponding subcarrier spacing configuration $\mu$.

A UE 102 configured to operation in BWPs of a serving cell, is configured by higher layers for the serving cell a set of at most four BWPs in the downlink for reception. At a given time, a single downlink BWP is active. The bases station 160 may not transmit, to the UE 102, PDSCH and/or PDCCH outside the active downlink BWP. A UE 102 configured to operation in BWPs of a serving cell, is configured by higher layers for the serving cell a set of at most four BWPs for transmission. At a given time, a single uplink BWP is active. The UE 102 may not transmit, to the base station 160, PUSCH or PUCCH outside the active BWP. The specific signaling (higher layers signaling) for BWP configurations are described later.

Figure 3:
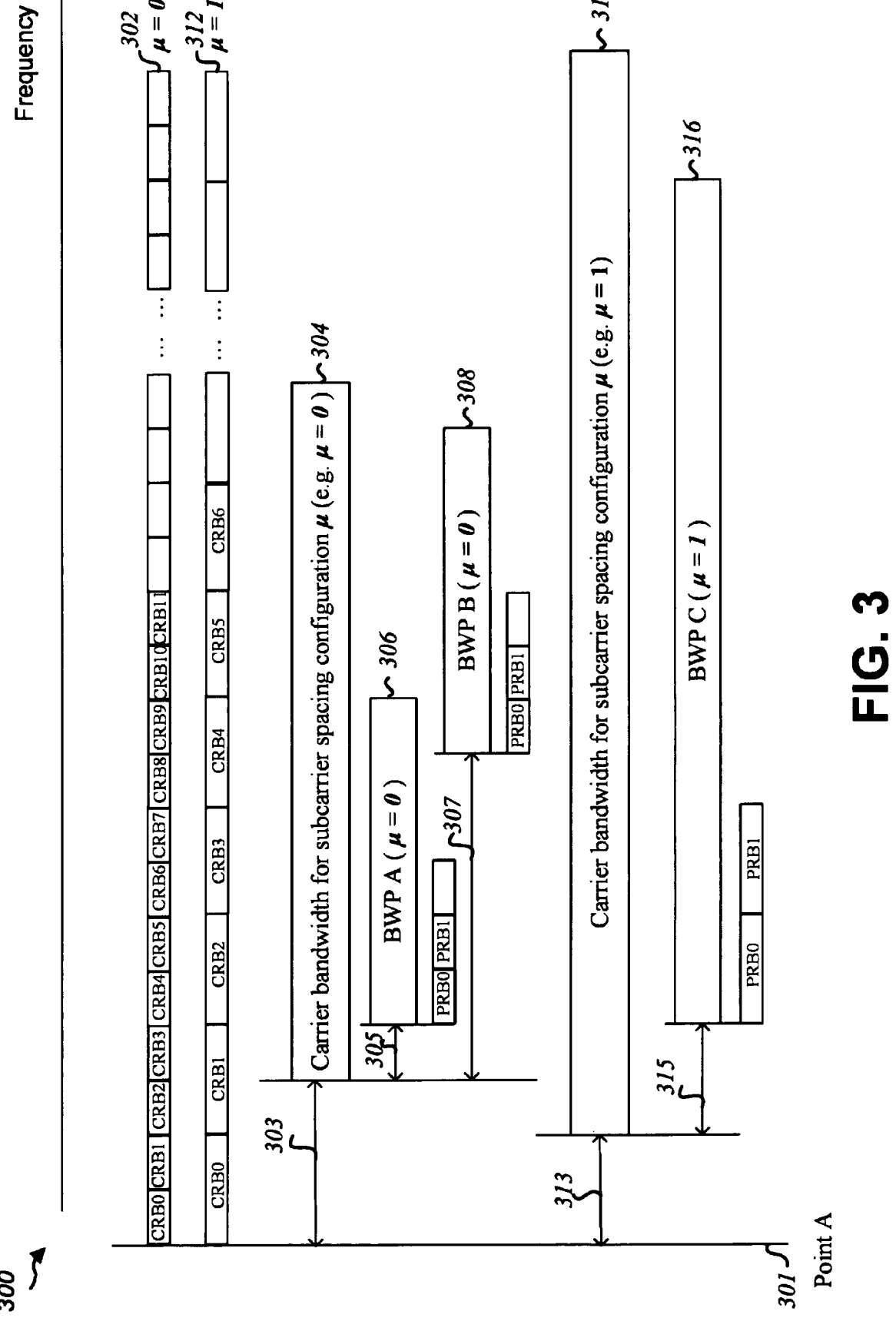
FIG. 3 is a diagram illustrating one example 300 of common resource block grid, carrier configuration and BWP configuration by a UE 102 and a base station 160.

FIG. 3 is a diagram illustrating one example 300 of common resource block grid, carrier configuration and BWP configuration by a UE 102 and a base station 160.

Point A 301 is a lowest subcarrier of a CRB0 for all subcarrier spacing configurations. The CRB grid 302 and the CRB grid 312 are corresponding to two different subcarrier spacing configurations. The CRB grid 302 is for subcarrier spacing configuration $\mu=0$ (i.e. the subcarrier spacing with 15 kHz). The CRB grid 312 is for subcarrier spacing configuration $\mu=1$ (i.e. the subcarrier spacing with 30 kHz). One or more carrier are determined by respective SCS-SpecificCarrier IEs, respectively. In the FIG. 3, the carrier 304 uses the subcarrier spacing configuration $\mu=0$. And the carrier 314 uses the subcarrier spacing configuration $\mu=1$. The starting position $N_{grid}^{start,\mu}$ of the carrier 304 is given based on the value of an offset 303 (i.e. $O_{carrier}$) indicated by an offsetToCarrier in an SCS-SpecificCarrier IE. As shown in the FIG. 3, for example, the offsetToCarrier indicates the value of the offset 303 as $O_{carrier}=3$. That is, the starting position $N_{grid}^{start,\mu}$ of the carrier 304 corresponds to the CRB3 of the CRB grid 302 for subcarrier spacing configuration $\mu=0$. In the meantime, the starting position $N_{grid}^{start,\mu}$ of the carrier 314 is given based on the value of an offset 313 (i.e. $O_{carrier}$) indicated by an offsetToCarrier in another SCS-SpecificCarrier IE. For example, the offsetToCarrier indicates the value of the offset 313 as $O_{carrier}=1$. That is, the starting position $N_{grid}^{start,\mu}$ of the carrier 314 corresponds to the CRB1 of the CRB grid 312 for subcarrier spacing configuration $\mu=1$. A carrier using different subcarrier spacing configurations can occupy different frequency ranges.

As above-mentioned, a BWP is for a given subcarrier spacing configuration $\mu$. One or more BWPs can be configured for a same subcarrier spacing configuration $\mu$. For example, in the FIG. 3, the BWP 306 is identified at least by the $\mu=0$, a frequency domain location, a bandwidth ($L_{RB}$), and an BWP index (index A). The first PRB (i.e. PRB0) of a BWP is determined at least by the subcarrier spacing of the BWP, an offset derived by the locationAndBandwidth and an offset indicated by the offsetToCarrier corresponding to the subcarrier spacing of the BWP. An offset 305 ($RB_{start}$) is derived as 1 by the locationAndBandwidth. According to the Formulas (2) and (3), the PRB0 of BWP 306 corresponds to CRB 4 of the CRB grid 302, and the PRB1 of BWP 306 corresponds to CRB 5 of the CRB grid 302, and so on.

Additionally, in the FIG. 3, the BWP 308 is identified at least by the $\mu=0$, a frequency domain location, a bandwidth ($L_{RB}$), and an BWP index (index B). For example, an offset 307 ($RB_{start}$) is derived as 6 by the locationAndBandwidth. According to the Formulas (2) and (3), the PRB0 of BWP 308 corresponds to CRB 9 of the CRB grid 302, and the PRB1 of BWP 308 corresponds to CRB 10 of the CRB grid 302, and so on.

Additionally, in the FIG. 3, the BWP 316 is identified at least by the $\mu=1$, a frequency domain location, a bandwidth ($L_{RB}$), and an BWP index (index B). For example, an offset 315 ($RB_{start}$) is derived as 1 by the locationAndBandwidth. According to the Formulas (2) and (3), the PRB0 of BWP 316 corresponds to CRB 2 of the CRB grid 312, and the PRB1 of BWP 316 corresponds to CRB 3 of the CRB grid 312, and so on.

As shown in the FIG. 3, a carrier with the defined subcarrier spacing locate in a corresponding CRB grid with the same subcarrier spacing. A BWP with the defined subcarrier spacing locate in a corresponding CRB grid with the same subcarrier spacing as well.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter Serving-CellConfigCommon is used to configure cell specific parameters of a UE's serving cell. The RRC parameter Serving-CellConfig is used to configure (add or modify) the UE with a serving cell, which may be the SpCell or an SCell of an MCS or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the U E.

If a UE is not configured (provided) initialDownlinkBWP from a base station, an initial DL BWP is defined by a location and number of contiguous physical resource blocks (PRBs), starting from a PRB with the lowest index and ending at a PRB with the highest index among PRBs of a CORESET for Type0-PDCCH CSS set (i.e. CORESET 0), and a subcarrier spacing (SCS) and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a USS set. A UE may monitor a set of PDCCH candidates in one or more of the following search space sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A base station may transmit, to a UE, information to specify one or more CORESET configuration and/or search space configuration. The information may be included in MIB and/or SIBs broadcasted by the base station. The information may be included in RRC configurations or RRC parameters. A base station may broadcast system information such as MIB, SIBs to indicate CORESET configuration or search space configuration to a UE. Or the base station may transmit a RRC message including one or more RRC parameters related to CORESET configuration and/or search space configuration to a UE.

An illustration of search space set configuration is described below.

A base station may transmit a RRC message including one or more RRC parameters related to search space configuration. Abase station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, searchSpaceZero) defines how and where to search for PDCCH candidates. 'search/monitor for PDCCH candidate for a DCI format' may also refer to 'monitor/search for a DCI format' for short.

For example, a RRC parameter searchSpaceZero is used to configure a common search space 0 of an initial DL BWP. The searchSpaceZero corresponds to 4 bits. The base station may transmit the searchSpaceZero via PBCH(MIB) or ServingCell.

Additionally, a RRC parameter SearchSpace is used to define how/where to search for PDCCH candidates. The RRC parameters search space may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Herein, the RRC parameter searchSpaceId is an identity or an index of a search space. The RRC parameter searchSpaceId is used to identify a search space. Or rather, the RRC parameter serchSpaceId provide a search space set index s, 0<=s<40. Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for. The RRC parameter ue-Specific may further include a new RRC parameter (e.g. dci-FormatsExt) in addition to the dci-Formats. The RRC parameter dci-FormatsExt indicates to monitor PDCCH candidates for DCI format 0_2 and DC format 1_2, or for DCI format 0_1, DCI format 1_1, DCI format 0_2 and DCI format 1_2. If the RRC parameter dci-FormatsExt is included in the RRC parameter ue-Specific, the UE may ignore the RRC parameter dci-Formats. That is to say, the UE may not monitor the PDCCH candidates for DCI formats indicated by the RRC parameter dci-Format, and may monitor the PDCCH candidates for DCI formats indicated by the RRC parameter dci-FormatsExt.

The UE 102 may monitor PDCCH candidates for DCI format 0_0 and/or DCI format 1_0 in either a CSS or a USS. The UE 102 may monitor PDCCH candidates for DCI format 0_1, DCI format 1_1, DCI format 0_2 and/or DCI format 12 only in a USS but cannot monitor PDCCH candidates for DCI format 0_1, DCI format 1_1, DCI format 0_2, and/or DCI format 1_2 in a CSS. The DCI format 0_1 may schedule up to two transport blocks for one PUSCH while the DCI format 0_2 may only schedule one transport blocks for one PUSCH. DCI format 0_2 may not consist of some fields (e.g. 'CBG transmission information' field), which may be present in DCI format 0_1. Similarly, the DCI format 1_1 may schedule up to two transport blocks for one PDSCH while the DCI format 12 may only schedule one transport blocks for one PDSCH. DCI format 1_2 may not consist of some fields (e.g., 'CBG transmission information' field), which may be present in DCI format 1_1. The DCI format 1_2 and DCI format 1_1 may consist of one or more same DCI fields (e.g., 'antenna port' field).

The base station 160 may schedule a UE 102 to receive PDSCH by a downlink control information (DCI). A DCI format provides DCI and includes one or more DCI fields. The one or more DCI fields in a DCI format are mapped to the information bits. As above-mentioned, the UE 102 can be configured by the base station 160 one or more search space sets to monitor PDCCH for detecting corresponding DCI formats. If the UE 102 detects a DCI format (e.g., the DCI format 1_0, the DCI format 1_1, or the DCI format 1_2) in a PDCCH, the UE 102 may be scheduled by the DCI format to receive a PDSCH.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

Herein, 'a UE monitor PDCCH for a search space set s' also refers to 'a UE may monitor a set of PDCCH candidates of the search space set s'. Alternatively, 'a UE monitor PDCCH for a search space set s' also refers to 'a UE may attempt to decode each PDCCH candidate of the search space set s according to the monitored DCI formats'. As above-mentioned, the PDCCH is used for transmitting or carrying Downlink Control Information (DCI). Thus, 'PDCCH', 'DCI', 'DCI format', and/or 'PDCCH candidate' are virtually interchangeable. In other words, 'a UE monitors PDCCH' implies 'a UE monitors PDCCH for a DCI format'. That is, 'a UE monitors PDCCH' implies 'a UE monitors PDCCH for detection of a configured DCI format'.

In the present disclosure, the term "PDCCH search space sets" may also refer to "PDCCH search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE.

An illustration of CORESET configuration is described below.

A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). ARRC parameter related to initial DL BWP configuration may also include the RRC parameter ControlResourceSetZero. RRC parameter ServingCellConfigCommon is used to configure cell specific parameters of a UE's serving cell and contains parameters which a UE would typically acquire from SSB, MIB or SIBs when accessing the cell form IDLE.

Additionally, a RRC parameter ControlResourceSet is used to configure a time and frequency CORESET other than CORESET 0. The RRC parameter ControlResourceSet may include a plurality of RRC parameters such as, ControlResourceSetId, frequencyDomainResource, duration, cce-REG-MappingType, precoderGranularity, tci-PresentInDCI, pdcch-DMRS-ScramblingID and so on.

Here, the RRC parameter ControlResourceSetId is an CORESET index p, used to identify a CORESET within a serving cell, where 0<p<12. The RRC parameter duration indicates a number of consecutive symbols of the CORESET $N_{symb}^{CORESET}$, which can be configured as 1, 2 or 3 symbols. A CORESET consists of a set of $N_{RB}^{CORESET}$ resource blocks (RBs) in the frequency domain and $N_{symb}^{CORESET}$ symbols in the time domain. The RRC parameter frequencyDomainResource indicates the set of $N_{RB}^{CoRESET}$ RBs for the CORESET. Each bit in the frequencyDomainResource corresponds a group of 6 RBs, with grouping starting from the first RB group in the BWP. The first (left-most/most significant) bit corresponds to the first RB group in the BWP, and so on. The first common RB of the first RB group has common RB index $6 \times ceiling(N_{BWP}^{start}/6)$. A bit that is set to 1 indicates that this RB group belongs to the frequency domain resource of this CORESET. Bits corresponding to a group of RBs not fully contained in the bandwidth part within which the CORESET is configured are set to zero. The ceiling(A) function hereinafter is to output a smallest integer not less than A.

According to the CORESET configuration, a CORESET (a CORESET 0 or a CORESET p) consists of a set of PRBs with a time duration of 1 to 3 OFDM symbols. The resource units Resource Element Groups (REGs) and Control Channel Elements (CCEs) are defined within a CORESET. A CCE consists of 6 REGs where a REG equals one resource block during one OFDM symbol. Control channels are formed by aggregation of CCE. That is, a PDCCH consists of one or more CCEs. Different code rates for the control channels are realized by aggregating different number of CCE. Interleaved and non-interleaved CCE-to-REG mapping are supported in a CORESET. Each resource element group carrying PDCCH carries its own DMRS.

FIG. 4 is a diagram illustrating one 400 example of CORESET configuration in a BWP by a UE 102 and a base station 160.

FIG. 4 illustrates that a UE 102 is configured with three CORESETs for receiving PDCCH transmission in two BWPs. In the FIG. 4, 401 represent point A. 402 is an offset in frequency domain between point A 401 and a lowest usable subcarrier on the carrier 403 in number of CRBs, and the offset 402 is given by the offsetToCarrier in the SCS-SpecificCarrier IE. The BWP 405 with index A and the carrier 403 are for a same subcarrier spacing configuration μ. The offset 404 between the lowest CRB of the carrier and the lowest CRB of the BWP in number of RBs is given by the locationAndBandwidth included in the BWP configuration for BWP A. The BWP 407 with index B and the carrier 403 are for a same subcarrier spacing configuration μ. The offset 406 between the lowest CRB of the carrier and the lowest CRB of the BWP in number of RBs is given by the locationAndBandwidth included in the BWP configuration for BWP B.

For the BWP 405, two CORESETs are configured. As above-mentioned, a RRC parameter frequencyDomainResource in respective CORESET configuration indicates the frequency domain resource for respective CORESET. In the frequency domain, a CORESET is defined in multiples of RB groups and each RB group consists of 6 RBs. For example, in the FIG. 4, the RRC parameter frequencyDomainResource provides a bit string with a fixed size (e.g. 45 bits) as like '11010000 . . . 000000' for CORESET #1. That is, the first RB group, the second RB group, and the fourth RB group belong to the frequency domain resource of the CORESET #1. Additionally, the RRC parameter frequencyDomainResource provides a bit string with a fixed size (e.g. 45 bits) as like '00101110 . . . 000000' for CORESET #2. That is, the third RB group, the fifth RB group, the sixth RB group and the seventh RB group belong to the frequency domain resource of the CORESET #2.

For the BWP 407, one CORESET is configured. As above-mentioned, a RRC parameter frequencyDomainResource in the CORESET configuration indicates the frequency domain resource for the CORESET #3. In the frequency domain, a CORESET is defined in multiples of RB groups and each RB group consists of 6 RBs. For example, in the FIG. 4, the RRC parameter frequencyDomainResource provides a bit string with a fixed size (e.g. 45 bits) as like '11010000 . . . 000000' for CORESET #3. That is, the first RB group, the second RB group, and the fourth RB group belong to the frequency domain resource of the CORESET #3. Although the bit string configured for CORESET #3 is same as that for CORESET #1, the first RB group of the BWP B is different from that of the BWP A in the carrier. Therefore, the frequency domain resource of the CORESET #3 in the carrier is different from that of the CORESET #1 as well.

Hereinafter, PDSCH reception procedures are described. The base station 160 may transmit, to the UE 102, a PDCCH with a DCI format and the corresponding PDSCH.

The PDSCH is scheduled by the DCI format. Upon detection of the PDCCH with a DCI format carrying DCI, the UE 102 may be scheduled to receive PDSCH scheduled by the DCI (DCI format) in the PDCCH. The UE 102 may derive, based on the DCI (DCI fields of the DCI format), necessary information for reception of the PDSCH. For example, the UE 102 may determine, at least based on a time domain resource assignment field, one, more, or all of a starting slot, time domain resource allocation, PDSCH mapping type, a PDSCH repetition number, and so on. The starting slot means a slot where the PDSCH is transmitted by the base station 160. If the UE 102 is configured with PDSCH repetition transmission, the starting slot means a slot where the first repetition of the PDSCH transmission is transmitted by the base station 160.

The time domain resource allocation means a starting symbol of the allocated PDSCH and a duration of the allocated PDSCH. To be more specific, the UE 102 may at least determine, based on a time domain resource assignment filed of the DCI format, a starting symbol S and a number of consecutive symbols L of the PDSCH transmission in the time domain. The number of consecutive symbols L counts from the starting symbol S within the starting slot. The resource allocation allocated for a PDSCH transmission in time domain may refer to as a PDSCH transmission occasion allocated for a PDSCH transmission or as a scheduled PDSCH resource. The PDSCH transmission occasion (or the scheduled PDSCH resource) comprises at least a starting symbol S, and a number of consecutive symbols L counting from the starting symbol S within a slot. In other words, the base station 160 may transmit, to the UE 102, the PDSCH in the PDSCH transmission occasion. And the UE 102 may receive, from a base station 160, the PDSCH in the PDSCH transmission occasion.

There are two PDSCH mapping types, i.e. one is PDSCH mapping type A and the other one is PDSCH mapping type B. The UE 102 may determine time location of the front-loaded DMRS symbol for the PDSCH depending on the PDSCH mapping type. In the present disclosure, the front-loaded DMRS symbol(s) for a PDSCH can be also referred to as the first DMRS symbol(s) for a PDSCH. Additional DMRS symbol(s) imply DMRS symbol(s) other than the front-loaded DMRS symbol for a PDSCH. Additional DMRS symbol(s) imply DMRS symbol(s) other than the first DMRS symbol for a PDSCH.

For PDSCH mapping type A, the front-loaded DMRS symbol (i.e. the first DMRS symbol) is in either a third symbol or a fourth symbol relative to the start of the slot where the PDSCH is transmitted. The base station 160 may use a parameter dmrs-TypeA-Position included in the MIB to indicate the position of the front-loaded DMRS symbol (i.e. the first DMRS symbol) to UEs who are camping on the serving cell. When the dmrs-TypeA-Position is set to 'pos2', the front-loaded DMRS symbol (i.e. the first DMRS symbol) for a PDSCH with PDSCH mapping type A is in a third symbol relative to the start of the slot, i.e. the front-loaded DMRS symbol is in a third symbol of the slot. On the other hand, when the dmrs-TypeA-Position is set to 'pos3', the front-loaded DMRS symbol for a PDSCH with PDSCH mapping type A is in a fourth symbol relative to the start of the slot, i.e. the front-loaded DMRS symbol for a PDSCH is in a fourth symbol of the slot. For PDSCH mapping type A, a PDSCH with allocation duration L ranging from 3 symbols to 14 symbols can be scheduled. While the starting symbol S of a PDSCH with PDSCH mapping type A can be scheduled in one of the first symbol, the second symbol, the third symbol, the fourth symbol in a slot.

For PDSCH mapping type B, the front-loaded DMRS symbol (i.e. the first DMRS symbol) may always be in the first symbol of the scheduled PDSCH resources. That is to say, the front-loaded (first) DMRS symbol for a PDSCH with PDSCH mapping type B is in a first symbol of the PDSCH. For PDSCH mapping type B, a PDSCH with allocation duration L ranging from 2 symbols to 13 symbols can be scheduled. While the starting symbol S of a PDSCH with PDSCH mapping type B can be scheduled in any of symbols in a slot other than the last symbol of the slot. The base station 160 may not simultaneously schedule a PDSCH with allocation duration of 14 symbols and configure PDSCH mapping type for the PDSCH as PDSCH mapping type B. In other words, only a PDSCH with allocation duration of 14 symbols with PDSCH mapping type A can be scheduled.

In the present disclosure, the base station may configure different DMRS configurations for PDSCH mapping type A and PDSCH mapping type B via RRC parameters.

A RRC parameter dmrs-DownlinkForPDSCH-Mapping-TypeA is used for DMRS configuration for PDSCH with PDSCH mapping type A. A RRC parameter dmrs-DownlinkForPDSCH-MappingTypeB is used for DMRS configuration for PDSCH with PDSCH mapping type B. Each of the RRC parameter dmrs-DownlinkForPDSCH-MappingTypeA and the RRC parameter dmrs-DownlinkForPDSCH-MappingTypeB may contain fields as like dmrs-Type, dmrs-AdditinalPosition, maxlength, and so on. The fields dmrs-Type, dmrs-AdditionalPosition, and maxlength may be set differently for the dmrs-DownlinkForPDSCH-Mapping-TypeA and the dmrs-DownlinkForPDSCH-MappingTypeB. Additionally or alternatively, the fields dmrs-Type, dmrs-AdditionalPosition, and maxlength can be also set same for the dmrs-DownlinkForPDSCH-MappingTypeA and the dmrs-DownlinkForPDSCH-MappingTypeB.

The RRC parameter dmrs-Type is used for selection of the DMRS configuration type for Downlink. In the present disclosure, two DMRS configuration types i.e. DMRS configuration type 1 and DMRS configuration type 2 are used. To be specific, if the dmrs-Type is not configured (i.e. the dmrs-Type is absent), the UE 102 uses DMRS configuration type 1. On the other hand, if the RRC parameter dmrs-Type is configured, the UE 102 uses DMRS configuration type 2. The difference between the DMRS configuration type 1 and the DMRS configuration type 2 is different densities in the frequency domain. The resource elements used for DMRS configuration type 1 per RB is denser than that used for DMRS configuration type 2 per RB in the frequency domain.

The RRC parameter dmrs-AdditinalPosition, which can be set to 'pos0', 'pos1', or 'pos3' by the base station 160, is used to indicate the position of additional DMRS symbol(s) for PDSCH. If the dmrs-AdditinalPosition is not configured (i.e. the dmrs-AdditinalPosition is absent), the UE determines the value of the dmrs-AdditinalPosition is set to 'pos2'. If dmrs-AdditinalPosition is set to 'pos0', there are no additional DMRS present for a PDSCH. If dmrs-Addi-tinalPosition is set to 'pos1', there are up to one additional DMRS present for a PDSCH depending on the allocation duration of the PDSCH. If dmrs-AdditinalPosition is set to 'pos2', there are up to two additional DMRS present for a PDSCH depending on the allocation duration of the PDSCH. If dmrs-AdditinalPosition is set to 'pos3', there are up to three additional DMRS present for a PDSCH depending on the allocation duration of the PDSCH.

The RRC parameter maxlengh is used to indicate the maximum number of OFDM symbols for DL front-loaded DMRS. The maxlength can be configured to 'len2' by the base station 160. That is, the UE 102 may determine the front-loaded DMRS is double-symbol front-loaded DMRS. Specifically, in the case that maxlength is configured to set to 'len2', the UE 102 may determine the front-loaded DMRS is single-symbol front-loaded DMRS or double-symbol front-loaded DMRS based on the associated DCI. On the other hand, if the maxlength is not configured (i.e. the maxlength is absent), the UE 102 determines that the max-length is set to 'len1'. That is, the UE may determine the front-loaded DMRS is single-symbol front-loaded DMRS. Double-symbol front loaded DMRS means front-loaded DMRS with 2 consecutive OFDM symbols. Single-symbol front-loaded DMRS means front-loaded DMRS with 1 OFDM symbol. Both the DMRS configuration type 1 and DMRS configuration type 2 can support the single-symbol front-loaded DMRS and the double-symbol front-loaded DMRS.

Figure 5:
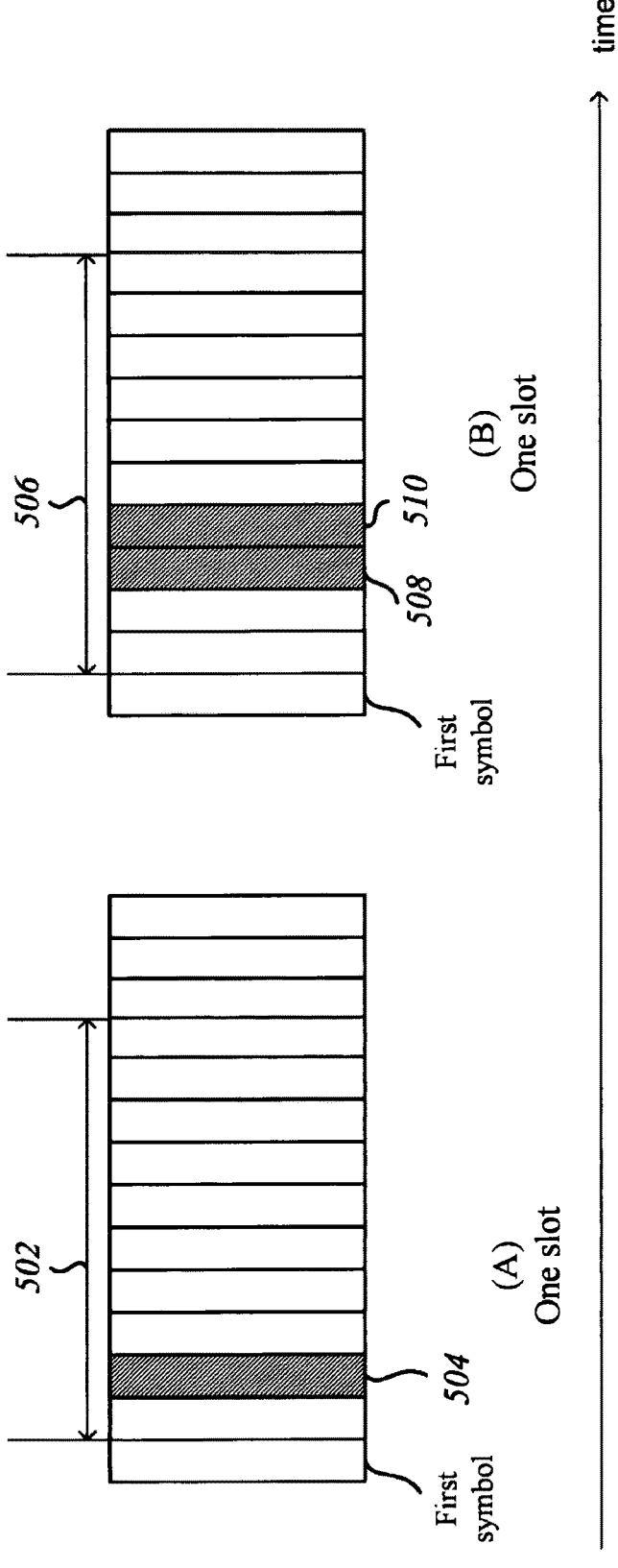
FIG. 5 is a diagram illustrating one example 500 of DMRS configuration for a PDSCH with PDSCH mapping type A.

FIG. 5 is a diagram illustrating one example 500 of DMRS configuration for a PDSCH with PDSCH mapping type A. PDSCH mapping type for PDSCHs illustrated in the FIG. 5 is provided as PDSCH mapping type A by the corresponding DCI formats which scheduled the PDSCHs in the FIG. 5, respectively.

FIG. 5(A) is an illustration where the RRC parameter dmrs-TypeA-Position is set to 'pos2' and single-symbol front-loaded DMRS is configured. RRC parameter dmrs-AdditinalPosition is set to 'pos0', i.e. there are no additional DMRS present for the PDSCH. In FIG. 5(A), the UE 102 is scheduled with a PDSCH with allocated resource 502 with PDSCH mapping type A. The position of the single-symbol front-loaded DMRS with one OFDM symbol 504 is in the third symbol relative to the start of the slot, which is indicated by the dmrs-TypeA-Position. The starting symbol S of the PDSCH with allocated resource 502 is in the second symbol of the slot, and the allocation duration L of the PDSCH with allocated resource 502 is 10 OFDM symbols.

FIG. 5(B) is an illustration where the RRC parameter dmrs-TypeA-Position is set to 'pos3' and double-symbol front-loaded DMRS is configured. RRC parameter dmrs-AdditinalPosition is set to 'pos0', i.e. there are no additional DMRS present for the PDSCH. In FIG. 5(B), the UE 102 is scheduled with a PDSCH with allocated resource 506 with PDSCH mapping type A. The double-symbol front-loaded DMRS is with two consecutive OFDM symbols. The position of the first symbol 508 of the double-symbol front-loaded DMRS is in the fourth symbol relative to the start of the slot, which is indicated by the dmrs-TypeA-Position. The position of the second symbol 510 of the double-symbol front-loaded DMRS is in the fifth symbol relative to the start of the slot. The starting symbol S of the PDSCH with allocated resource 506 is in the second symbol of the slot, and the allocation duration L of the PDSCH with allocated resource 502 is 10 OFDM symbols.

Figure 6:
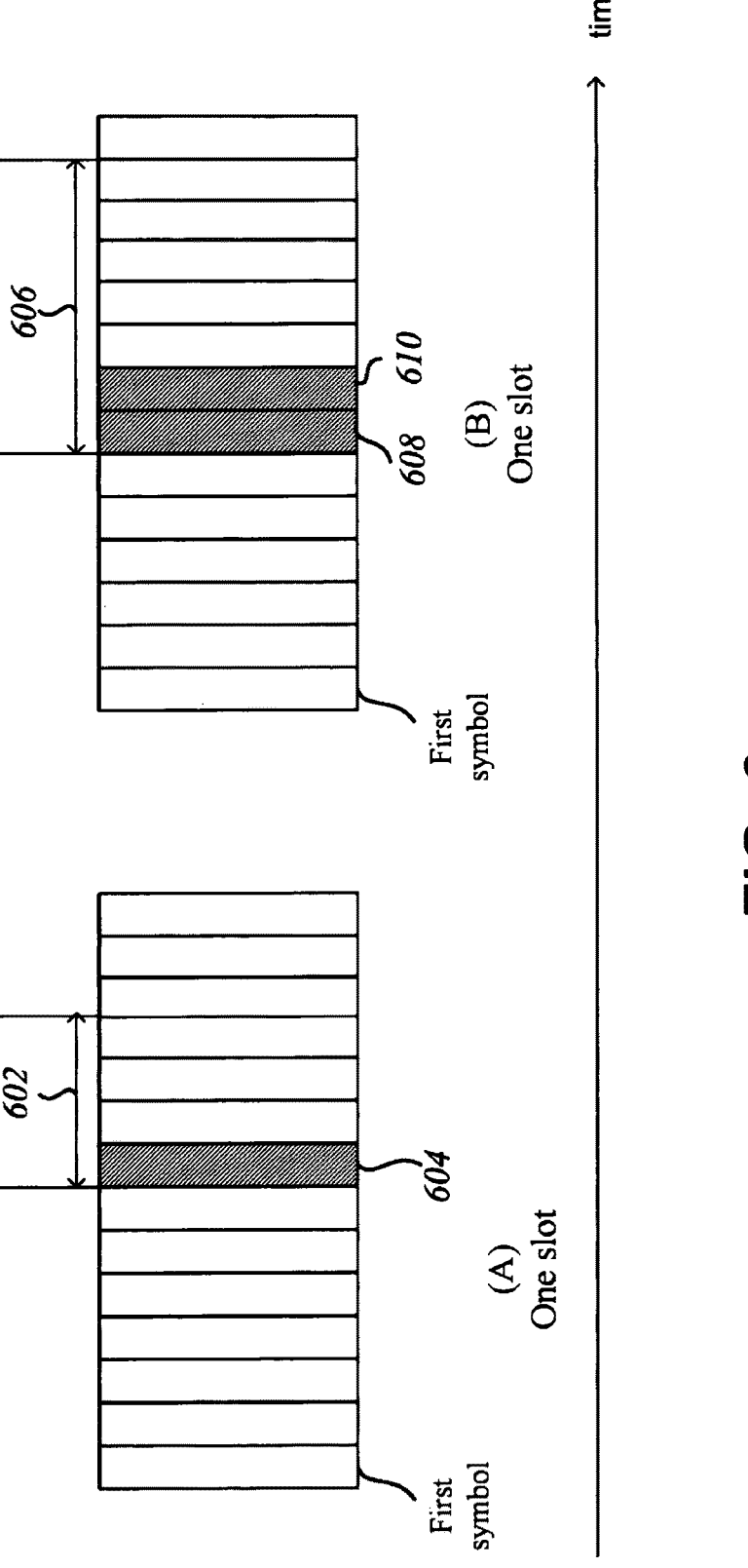
FIG. 6 is a diagram illustrating one example 600 of DMRS configuration for a PDSCH with PDSCH mapping type B.

FIG. 6 is a diagram illustrating one example 600 of DMRS configuration for a PDSCH with PDSCH mapping type B. PDSCH mapping type for PDSCHs illustrated in the FIG. 6 is provided as PDSCH mapping type B by the corresponding DCI formats which scheduled the PDSCHs in the FIG. 6, respectively.

FIG. 6(A) is an illustration where single-symbol front-loaded DMRS is configured. RRC parameter dmrs-AdditinalPosition is set to 'pos0', i.e. there are no additional DMRS present for the PDSCH with mapping type B. In FIG. 6 (A), the UE 102 is scheduled with a PDSCH with allocated resource 602 with PDSCH mapping type B. The starting symbol S of the PDSCH with allocated resource 602 is in the eighth symbol of the slot, and the allocation duration L of the PDSCH with allocated resource 602 is 4 OFDM symbols. The position of the single-symbol front-loaded DMRS with one OFDM symbol 604 is in the eighth symbol, which is the first symbol of the allocated PDSCH resource 602.

FIG. 6(B) is an illustration where double-symbol front-loaded DMRS is configured. RRC parameter dmrs-AdditinalPosition is set to 'pos0', i.e. there are no additional DMRS present for the PDSCH with mapping type B. In FIG. 6 (B), the UE 102 is scheduled with a PDSCH with allocated resource 606 with PDSCH mapping type B. The starting symbol S of the PDSCH with allocated resource 606 is in the seventh symbol of the slot, and the allocation duration L of the PDSCH with allocated resource 502 is 7 OFDM symbols. The double-symbol front-loaded DMRS is with two consecutive OFDM symbols. The position of the first symbol 608 of the double-symbol front-loaded DMRS is in the seventh symbol, which is the first symbol of the allocated PDSCH resource 606. The position of the second symbol 610 of the double-symbol front-loaded DMRS is in the eighth symbol relative to the start of the slot.

In the present disclosure, the UE 102 may be configured with either of the RRC parameters dmrs-Downlink-ForPDSCH-MappingTypeA and dmrs-Downlink-ForPDSCH-MappingTypeB or both the RRC parameters dmrs-DownlinkForPDSCH-MappingTypeA and dmrs-DownlinkForPDSCH-MappingTypeB.

As above-mentioned, the UE 102 may receive a PDCCH with a DCI format which schedule a PDSCH. Upon detection of the PDCCH with the DCI format, the UE 102 may determine the PDSCH mapping type for the scheduled PDSCH. In a case that the scheduled PDSCH is with PDSCH mapping type A, the UE 102 may use the DMRS configuration configured by the RRC parameter dmrs-DownlinkForPDSCH-MappingTypeA for receiving the scheduled PDSCH. In a case that the scheduled PDSCH is with PDSCH mapping type B, the UE 102 may use the DMRS configuration configured by the RRC parameter dmrs-DownlinkForPDSCH-MappingTypeB for receiving the scheduled PDSCH.

Illustration of antenna ports is described hereinafter.

An antenna port is defined such that the channel over which a symbol on the antenna port is conveyed can be inferred from the channel over which another symbols on the same antenna port is conveyed. For example, for DMRS associated with a PDSCH, the channel over which a PDSCH symbol on one antenna port is conveyed can be inferred from the channel over which a DMRS on the same antenna port is conveyed only if the two symbols are within the same resource as the scheduled PDSCH, and in the same precoding resource block group (PRGs). The PDSCH and the DMRS transmitted on a same antenna port p may have same antenna configuration. The UE 102 may estimate the channel characteristics based on the DMRS on an antenna por p and process a PDSCH on the same antenna port p at least based on the estimated channel characteristics.

The UE and/or the base station can distinguish a transmitted signal/channel on a symbol from another transmitted signal/channel on the same symbol if their antenna ports are different. As above-mentioned, given the different density in the frequency domain, a number of DMRS antenna ports assigned for DMRS configuration type 1 is different from that assigned for DMRS configuration type 2. That is, different DMRS configuration types support different numbers of DMRS antenna port (or DMRS port indexes).

Figure 7:
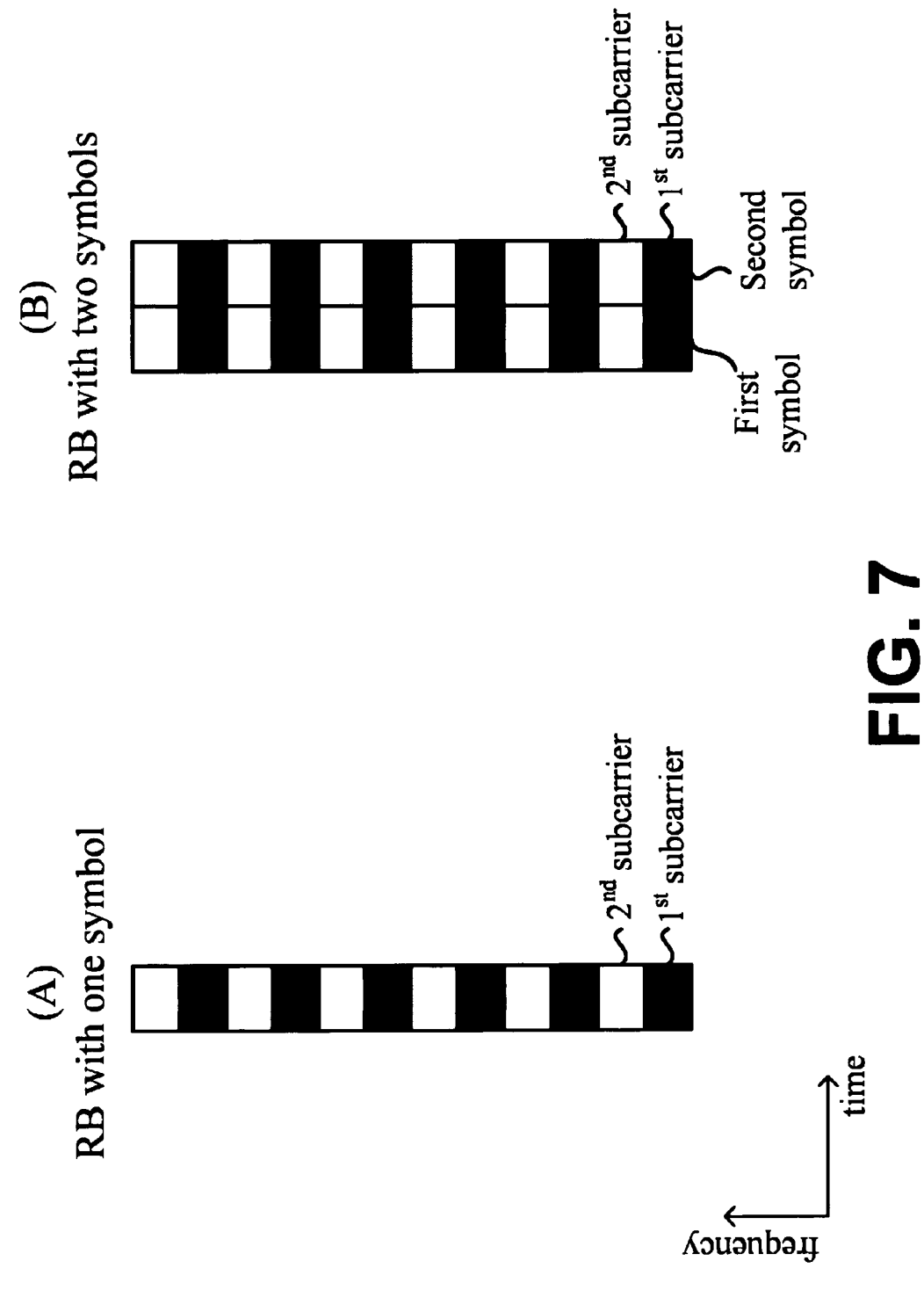
FIG. 7 is a diagram illustrating one example 700 of CDM groups and associated DMRS antenna port(s) for DMRS configuration type 1.

There are two CDM groups (DMRS CDM groups), i.e. CDM group 0 and CDM group 1, defined for DMRS configuration type 1. Depending on the maximum number of OFDM symbols of front-loaded DMRS, each CDM group contain different resource elements and different numbers of DMRS port indexes. FIG. 7 is a diagram illustrating one example 700 of CDM groups and associated DMRS antenna port(s) for DMRS configuration type 1. FIG. 7 (A) shows an illustration of DMRS configuration type 1 with single-symbol front-loaded DMRS per RB. FIG. 7 (B) shows an illustration of DMRS configuration type 1 with double-symbol front-loaded DMRS per RB.

DMRS configuration type 1 with single-symbol front-loaded DMRS supports up to 4 DMRS antenna ports. As depicted in the FIG. 7 (A), in a case of DMRS configuration type 1 with single-symbol front-loaded DMRS, each CDM group occupies 6 resource elements per RB on one DMRS symbol. CDM group 0 occupies 6 resource elements marked with gray, i.e. the $1^{st}$, $3^{rd}$, $5^{th}$, $7^{th}$, $9^{th}$, and $11^{th}$ subcarriers of the RB. On the other hand, CDM group 1 occupies 6 resource elements marked with white, i.e. the $2^{nd}$, $4^{th}$, $6^{th}$, $8^{th}$, $10^{th}$, and $12^{th}$ subcarriers of the RB. CDM group 0 contains DMRS port with indexes 1000 and 1001 (DMRS antenna ports p=1000 and μ=1001). CDM group 1 contains DMRS port with indexes 1002 and 1003 (DMRS antenna ports p=1002 and p=1003).

All DMRS antenna ports (i.e. DMRS antenna ports 1000 and 1001) of CDM group 0 are mapped to subcarriers marked with gray while all DMRS antenna ports (i.e. DMRS antenna ports 1002 and 1003) of CDM group 1 are mapped to subcarriers marked with white. Different DMRS antenna ports within a same CDM group are mapped to same resource elements of the same CDM group. Orthogonal cover code (OCC) in the frequency domain can be used to distinguish these different DMRS antenna ports which are mapped to same resource elements.

DMRS configuration type 1 with double-symbol front-loaded DMRS supports up to 8 DMRS antenna ports. As depicted in the FIG. 7 (B), in a case of DMRS configuration type 1 with double-symbol front-loaded DMRS, each CDM group occupies 12 resource elements per RB on two DMRS OFDM symbols. CDM group 0 occupies 12 resource elements marked with gray, i.e. the $1^{st}$, $3^{rd}$, $5^{th}$, $7^{th}$, $9^{th}$, and $11^{th}$ subcarriers of the RB both in the first symbol and the second symbol of the double-symbol front-loaded DMRS. On the other hand, CDM group 1 occupies 12 resource elements marked with white, i.e. the $2^{nd}$, $4^{th}$, $6^{th}$, $8^{th}$, $10^{th}$, and $12^{th}$ subcarriers of the RB both in the first symbol and the second symbol of the double-symbol front-loaded DMRS. CDM group 0 contains DMRS port with indexes 1000, 1001, 1004 and 1005. (DMRS antenna ports p=1000, 1001, 1004 and 1005). CDM group 1 contains DMRS port with indexes 1002, 1003, 1006 and 1007 (DMRS antenna ports p=1002, 1003, 1006 and 1007).

All DMRS antenna ports of CDM group 0 are mapped to subcarriers marked with gray while all DMRS antenna ports of CDM group 1 are mapped to subcarriers marked with white. Different 4 DMRS antenna ports within a same CDM group are mapped to same resource elements of the same CDM group. Orthogonal cover code (OCC) in the frequency domain and in the time domain can be used to distinguish these different 4 DMRS antenna ports which are mapped to same resource elements.

Figure 8:
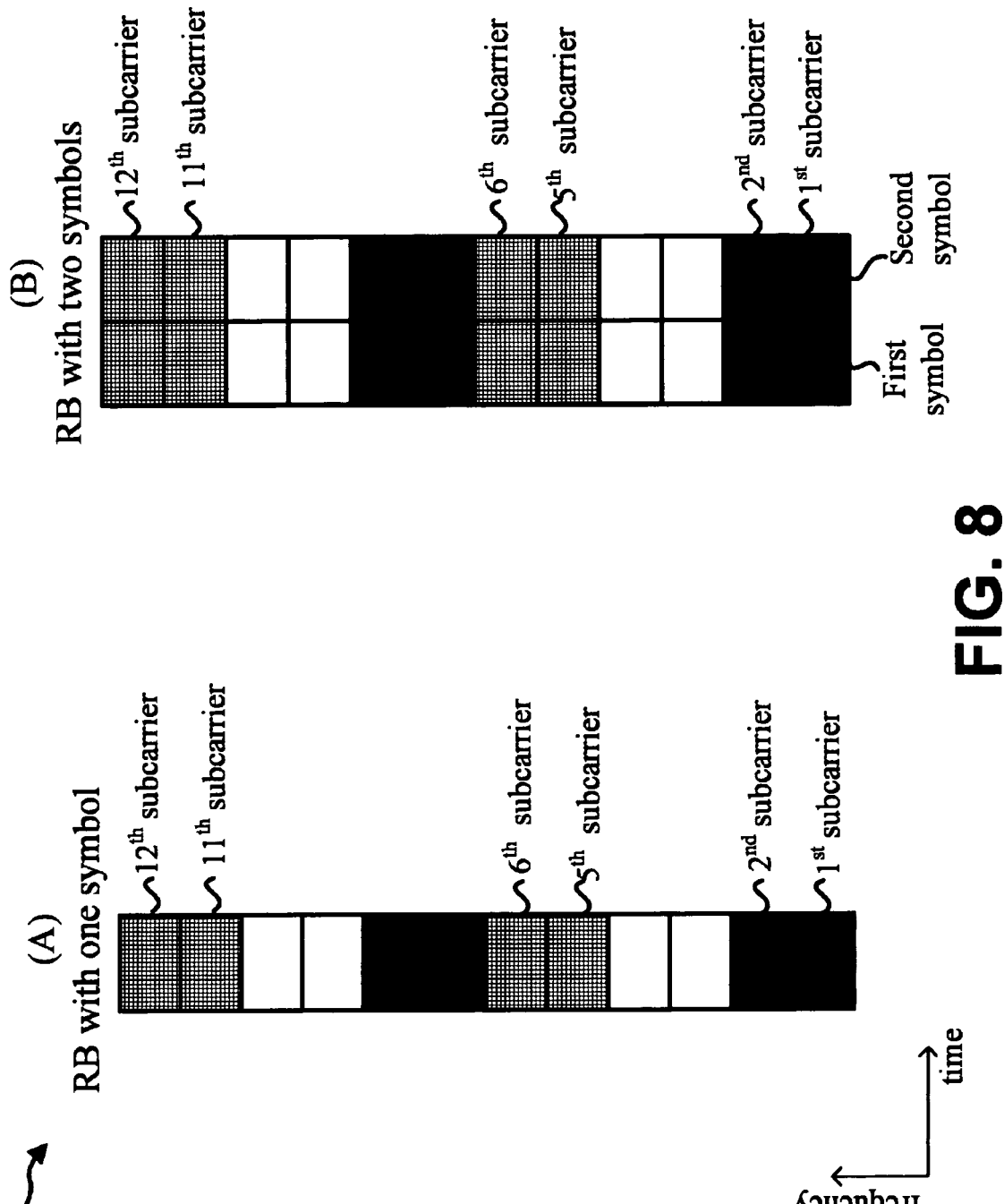
FIG. 8 is a diagram illustrating one example 800 of CDM groups and associated DMRS antenna port(s) for DMRS configuration type 2.

On the other hand, there are 3 CDM groups (DMRS CDM groups), i.e. CDM group 0, CDM group 1 and CDM group 2, defined for DMRS configuration type 2. Depending on the maximum number of OFDM symbols of front-loaded DMRS, each CDM group contain different resource elements and different numbers of DMRS port indexes. FIG. 8 is a diagram illustrating one example 800 of CDM groups and associated DMRS antenna port(s) for DMRS configuration type 2. FIG. 8 (A) shows an illustration of DMRS configuration type 2 with single-symbol front-loaded DMRS per RB. FIG. 8 (B) shows an illustration of DMRS configuration type 2 with double-symbol front-loaded DMRS per RB.

DMRS configuration type 2 with single-symbol front-loaded DMRS supports up to 6 DMRS antenna ports. As depicted in the FIG. 8(A), in a case of DMRS configuration type 2 with single-symbol front-loaded DMRS, each CDM group occupies 4 resource elements per RB on one DMRS symbol. CDM group 0 occupies 4 resource elements marked with gray, i.e. the $1^{st}$, $2^{nd}$, $7^{th}$, and $8^{th}$ subcarriers of the RB. CDM group 1 occupies 4 resource elements marked with white, i.e. the $3^{rd}$, $4^{th}$, $9^{th}$ and $10^{th}$ subcarriers of the RB. CDM group 2 occupies 4 resource elements marked with grid, i.e. the $5^{th}$, $6^{th}$, $11^{th}$ and $12^{th}$ subcarriers of the RB. CDM group 0 contains DMRS port with indexes 1000 and 1001 (DMRS antenna ports p=1000 and p=1001). CDM group 1 contains DMRS port with indexes 1002 and 1003 (DMRS antenna ports p=1002 and p=1003). CDM group 2 contains DMRS port with indexes 1004 and 1005 (DMRS antenna ports p=1004 and p=1005).

All DMRS antenna ports (i.e. DMRS antenna ports 1000 and 1001) of CDM group 0 are mapped to subcarriers marked with gray. All DMRS antenna ports (i.e. DMRS antenna ports 1002 and 1003) of CDM group 1 are mapped to subcarriers marked with white. All DMRS antenna ports (i.e. DMRS antenna ports 1004 and 1005) of CDM group 2 are mapped to subcarriers marked with grid. Different DMRS antenna ports within a same CDM group are mapped to same resource elements of the same CDM group. Orthogonal cover code (OCC) in the frequency domain can be used to distinguish these different DMRS antenna ports which are mapped to same resource elements.

DMRS configuration type 2 with double-symbol front-loaded DMRS supports up to 12 DMRS antenna ports. As depicted in the FIG. 8(B), in a case of DMRS configuration type 2 with double-symbol front-loaded DMRS, each CDM group occupies 8 resource elements per RB on two consecutive DMRS symbols. CDM group 0 occupies 8 resource elements marked with gray, i.e. the $1^{st}$, $2^{nd}$, $7^{th}$, and $8^{th}$ subcarriers of the RB both in the first symbol and the second symbol of the double-symbol front-loaded DMRS. CDM group 1 occupies 8 resource elements marked with white, i.e. the $3^{rd}$, $4^{th}$, $9^{th}$ and $10^{th}$ subcarriers of the RB both in the first symbol and the second symbol of the double-symbol front-loaded DMRS. CDM group 2 occupies 8 resource elements marked with grid, i.e. the $5^{th}$, $6^{th}$, $11^{th}$ and $12^{th}$ subcarriers of the RB both in the first symbol and the second symbol of the double-symbol front-loaded DMRS. CDM group 0 contains DMRS port with indexes 1000, 1001, 1006 and 1007 (DMRS antenna ports μ=1000, 1001, 1006 and 1007). CDM group 1 contains DMRS port with indexes 1002, 1003, 1008 and 1009 (DMRS antenna ports p=1002, 1003, 1008 and 1009). CDM group 2 contains DMRS port with indexes 1004, 1005, 1010 and 1011 (DMRS antenna ports μ=1004, 1005, 1010 and 1011).

All DMRS antenna ports of CDM group 0 are mapped to subcarriers marked with gray. All DMRS antenna ports of CDM group 1 are mapped to subcarriers marked with white. All DMRS antenna ports of CDM group 2 are mapped to subcarriers marked with grid. Different 4 DMRS antenna ports within a same CDM group are mapped to same resource elements of the same CDM group. Orthogonal cover code (OCC) in the frequency domain and in the time domain can be used to distinguish these different 4 DMRS antenna ports which are mapped to same resource elements.

The base station 160 may inform the IE 102 which DMRS antenna port(s) among above-mentioned one or more DMRS port indexes are used for a corresponding PDSCH reception via the antenna port field in a DCI format which schedules the corresponding PDSCH. In the present disclosure, the UE 102 may be provided with one or more predefined tables associated with antenna port indication. These predefined tables hereinafter can be referred to as antenna port tables (or predefined antenna port tables), which are used for antenna port indication for a corresponding PDSCH. One antenna port table corresponds to one combination {DMRS configuration type, maxlength}. Therefore, up to 4 antenna port tables are predefined to correspond to {DMRS configuration type 1, maxlength set to 'len1'}, {DMRS configuration type 1, maxlength set to 'len2' }, {DMRS configuration type 2, maxlength set to 'len1' }, and {DMRS configuration type 2, maxlength set to 'len2' }, respectively. These four predefined antenna port tables are provided in the specification [TS 38.212].

Different predefined antenna port tables may contain different numbers of entries. Therefore, different predefined antenna port tables would require different bitwidths of antenna port field to indicate a corresponding entry in their respective tables. One predefined table corresponding to {DMRS configuration type 1, maxlength set to 'len1'} defines an antenna port field with 4 bits. One predefined table corresponding to {DMRS configuration type 1, maxlength set to 'len2' } defines an antenna port field with 5 bits. One predefined table corresponding to {DMRS configuration type 2, maxlength set to 'len1'} defines an antenna port field with 5 bits. One predefined table corresponding to {DMRS configuration type 2, maxlength set to 'len2'} defines an antenna port field with 6 bits. In other words, the bitwidth of an antenna port field in a DCI format is determined at least based on the DMRS configuration type and maximum number of front-loaded DMRS applied to PDSCH scheduled by the DCI format.

Each predefined antenna port table at least contains one or more entries where each entry provides a value for an index of the entry in the table, a value for a number of DMRS CDM groups without data and value(s) for DMRS port index(es). In some entries, value for a number of DMRS CDM groups without data and value(s) for DMRS port index(es) may be set as reserved. That is, for each predefined antenna port table, every entry except some reserved entries at least provide or contain a value for 'number of DMRS CDM groups without data' and value(s) for DMRS port index(es). In other words, one antenna port table may contain a first list of one or more entries, each of which at least provides a value for 'number of DMRS CDM groups without data' and values for DMRS port index(es), and a second list of zero, one or more reserved entries. A reserve entry implies the entry does not provide a value for 'number of DMRS CDM groups without data' and values for DMRS port index(es).

FIG. 9 is a diagram illustrating one example of one predefined antenna port table 900. Table 900 corresponds to {DMRS configuration type 1, maxlength set to 'len1' (i.e. single-symbol front-loaded DMRS)}. Table 900 contains 16 entries (or rows) of antenna port configuration. As depicted in the Table 900, each entry except some reserved entries at least provides or contains a value for 'number of DMRS CDM groups without data' and values for DMRS port index(es) among one or more DMRS port indexes.

When the UE 102 attempts to receive a PDSCH upon detection of a DCI format, the UE 102 may need to select an antenna port table from the 4 predefined antenna port. In other words, in order to receive a PDSCH, the UE 102 may need to select an antenna port table from 4 predefined antenna port tables according to the DMRS configuration type and the maxlength applied to the PDSCH. As above-mentioned, the time domain resource assignment field indicates PDSCH mapping type for the scheduled PDSCH. In a case that the PDSCH mapping type for the scheduled PDSCH is indicated as PDSCH mapping type A, the UE 102 selects one antenna port table corresponding to the DMRS configuration type and maxlength, which are configured in the RRC parameter dmrs-DownlinkForPDSCH-Mapping-TypeA. In a case that the PDSCH mapping type for the scheduled PDSCH is indicated as PDSCH mapping type B, the UE 102 selects one antenna port table corresponding to the DMRS configuration type and maxlength, which are configured in the RRC parameter dmrs-Downlink-ForPDSCH-MappingTypeB.

After determining the antenna port table, the value of the antenna port field indicates a corresponding entry in the determined antenna port table. If the value of antenna port field in the DCI format is 0, the UE 102 may use an entry with value 0 in the determined antenna port table to determine the DMRS port(s) and the value for 'number of DMRS CDM groups without data'. If the value of antenna port field in the DCI format is 1, the IE 102 may use an entry with value 1 in the determined antenna port table to determine the DMRS port(s) and the value for 'number of DMRS CDM groups without data'.

The value for 'number of DMRS CDM groups without data' in a predefined antenna port table may be configured as 1, 2, or 3. The 'number of DMRS CDM group without data' of values 1, 2, 3 refers to CDM groups {0}, {0, 1}, {0, 1, 2} respectively. The 'number of DMRS CDM group without data' is used to indicate resource elements of the indicated CDM groups on the DMRS symbol(s) may be not used for PDSCH transmission. In other words, resource elements which belong to CDM groups not indicated by the value for 'number of DMRS CDM group without data' may be used for PDSCH transmission.

The value for DMRS port index may be configured as a value ranging from 0 to 11. For example, value 0 for the DMRS port index corresponds to DMRS port index 1000 (DMRS antenna port 1000) and/or PDSCH antenna port 1000, value 1 for the DMRS port index corresponds to DMRS port index 1001 (DMRS antenna port 1001), and/or PDSCH antenna port 1001, and so on.

For example, in a case that the first entry of the table 900 is indicated by the value of antenna port field, the value for number of DMRS CDM group without data is provided as 1 and the value for DMRS port index is provided as 0. DMRS port index with value 0 means that the transmission of DMRS and/or PDSCH are performed on antenna port 1000. The 'number of DMRS CDM group without data' of values 1 means that resource elements of the indicated CDM group 0 on the DMRS symbol(s) are not used for PDSCH transmission. On the other hand, the 'number of DMRS CDM group without data' of values 1 means that resource elements of the CDM group 1 on the DMRS symbol(s) are used for the PDSCH transmission. That is, the base station 160 may map the PDSCH on the resource elements of CDM group 1 on DMRS symbol(s), for example, the resource elements marked with white in the FIG. 7. The UE 102 may receive the PDSCH on the resource elements of CDM group 1 on DMRS symbol(s), for example, the resource elements marked with white in the FIG. 7.

For example, in a case that the 8$^{th}$ entry of the table 900 is indicated by the value of antenna port field, the value for number of DMRS CDM group without data is provided as 2 and the values for DMRS port indexes are provided as 0, 1. DMRS port indexes with value 0, 1 means that the transmission of DMRS and/or PDSCH are performed on antenna ports 1000 and 1001. The 'number of DMRS CDM group without data' of values 2 means that resource elements of the indicated CDM group {0, 1} on the DMRS symbol(s) are not used for PDSCH transmission. That is, the base station 160 may not map the PDSCH on the resource elements of CDM group 1 on DMRS symbol(s), for example, the resource elements marked with white in the FIG. 7. The UE 102 may not receive the PDSCH on the resource elements of CDM group 1 on DMRS symbol(s), for example, the resource elements marked with white in the FIG. 7.

Compared with the Release 15/16 UEs, cost reduction for a new type UEs (e.g., wearable devices, wireless industrial sensors, video surveillance) is desirable. To reduce the cost and the complexity, the new type UEs would be equipped with less reception antennas, reduced maximum number of MIMO layers, and/or the reduced RF bandwidth relative to the Release 15/16 UEs. The reduced reception antennas would result in a reduced power for the received channels/signals. The reduced RF bandwidth would also result in a reduced frequency diversity. The reduced maximum number of MIMO layer may degrade the spectral efficiency for these UEs.

Therefore, reduced reception antennas and/or reduced maximum number of downlink MIMO layers would result in a downlink performance degradation. To compensate the degraded downlink performance, for example, DCI format with a reduced payload size would be beneficial to improve the PDCCH reception reliability. It would be desirable to redesign the bitwidth of DCI fields in DCI formats to reduce the payload sizes of DCI formats.

As above-mentioned, a DCI format is mapped to CCEs and transmitted by the base station 160. If same CCE resources are used for transmitting a PDCCH with a DCI format with reduced payload size, the DCI format with reduced payload size results in a lower code rating of the PDCCH which eventually improve the PDCCH reception reliability and coverage. On the other hand, if less CCE resources are used for transmitting a PDCCH with the DCI format with reduced payload size, the PDCCH block probability could be reduced.

Moreover, for those UEs who only support one layer for downlink reception and/or are equipped with only 1 reception antenna, the current design of antenna port field in specifications, which is capable of indicating more than one MIMO layer for downlink reception but requires more bitwidth (size) of the antenna port field, is not appropriate and beneficial. In various implementations of the present disclosure, bit reduction of DCI antenna port field is performed for a DCI format. The DCI format is used for scheduling of PDSCH in one serving cell. By reducing the bitwidth (size) of antenna port field of a DCI format, payload size of the DCI format is reduced and reception performance of PDCCH with the DCI format would be improved as above-mentioned.

FIG. 10 is a flow diagram illustrating one implementation of a method 1000 for determining bitwidth of the antenna port field by a UE 102. In the implementation of the present disclosure, the bitwidth of the antenna port field in a DCI format is determined at least based on a total count of one or more entries included in a RRC parameter.

The UE 102 may receive 1002, from a base station 160, a first radio resource control (RRC) parameter (e.g. antennaPortList). The first RRC parameter (e.g. antennaPortList) may be indicated in the broadcasted system information (e.g., MIB, SIB1, or other SIBs), or in a RRC message. The first RRC parameter is applied to a first DCI format. The first DCI format is used for scheduling of PDSCH in a serving cell. The first DCI format can be transmitted in a USS set and may not be transmitted in a CSS set. The first RRC parameter is related to antenna port configuration for receiving a PDSCH scheduled by the first DCI format. The first RRC parameter may contain one or more entries (rows, elements, indexes) where each entry at least provide a value for 'number of DMRS CDM groups without data' and value(s) for DMRS port index(es). Specifically, the first RRC parameter may contain one or more entries wherein each entry at least provides a value for 'number of DMRS CDM groups without data' and one value for one DMRS port index among one or more DMRS port indexes. That is, the first RRC parameter may be a list of configured one or more entries related to antenna port configuration. The value for 'number of DMRS CDM groups without data' may be configured as 1, 2, or 3. The 'number of DMRS CDM group without data' of values 1, 2, 3 refers to CDM groups {0}, {0, 1}, {0, 1, 2} respectively. The value for DMRS port index may be configured as a value ranging from 0 to 11. For example, value 0 for the DMRS port index corresponds to DMRS port index 1000 (DMRS antenna port 1000) and/or PDSCH antenna port 1000, value 1 for the DMRS port index corresponds to DMRS port index 1001 (DMRS antenna port 1001), and/or PDSCH antenna port 1001, and so on. Each entry in the first RRC parameter may only indicate or provide one value for one DMRS port index among one or more DMRS port indexes. That is, each entry in the first RRC parameter may not provide a plurality of values for a plurality of DMRS port indexes among the one or more DMRS port indexes.

The UE 102 and/or the base station 160 may determine 1004, a bitwidth of an antenna port field in the first DCI format at least based on a total count (quantity) of the one or more entries included in the first RRC parameter. For example, the UE 102 and/or the base station 160 may determine the bitwidth of the antenna port field in the first DCI format as ceiling(log$_2$(N)) bits, where N is the total count (quantity) of the one or more entries in the first RRC parameter. The base station 160 may generate the antenna port field with ceiling(log$_2$(N)) bits in the first DCI format to the UE 102.

In a case that the first RRC parameter contains only one entry, i.e. N is equal to one, the UE 102 and/or the base station 160 may determine the antenna port field in the first DCI format as 0 bit. In this case, the base station 160 may not generate an antenna port field in the first DCI format to the UE 102. In other words, the base station 160 may generate the antenna port field with 0 bit in the first DCI format to the UE 102.

The base station 160 may determine an entry from the first RRC parameter and use the value of the antenna port field in the first DCI format to indicate the determined entry. A value of the antenna port field indicates (corresponds to) an entry of the one or more entries in the first RRC parameter. For example, the antenna port field with value k (k>=0) indicates (or corresponds to) the (k+1)th entry of the one or more entries in the first RRC parameter. Specifically, the antenna port field with value 0 indicates (or corresponds to)

the first entry of the one or more entries in the first RRC parameter, the antenna port field with value 1 indicates (or corresponds to) the second entry of the one or more entries in the first RRC parameter, and so on. In other words, the base station 160 may use the antenna port field to indicate a corresponding entry which is used for PDSCH transmission.

The base station 160 may generate the first DCI format with the antenna port field and transmit the first DCI format to the UE 102. The base station 160 may transmit a PDSCH scheduled by the first DCI format to the UE 102. The PDSCH transmission scheduled by the first DCI format is performed on antenna port(s) indicated by the antenna port field in the first DCI format.

The UE 102 may receive 1006, from the base station 160, a PDCCH with the first DCI format with the antenna port field. Upon detection of the PDCCH with the first DC format, the UE 102 may receive a PDSCH scheduled by the first DCI format. According to the antenna port field in the first DCI format, the UE 102 may determine an entry which provide the antenna port configuration for the PDSCH as like a value for 'number of DMRS CDM groups without data' and a value for DMRS port index. The UE 102 may receive the scheduled PDSCH based on the number of DMRS CDM groups without data and the DMRS port index associated to the entry corresponding to the value indicated in the antenna port field. To be specific, based on the given value for the DMRS port index, the UE 102 may determine the DMRS antenna port and/or the PDSCH antenna port for receiving the PDSCH. For example, if the value for DMRS port index is given as 0, the UE 102 may determine the DMRS antenna port and/or the PDSCH antenna port as p=1000 (1000+0). In other words, the base station 160 may transmit the DMRS and the PDSCH using antenna port 1000. The UE 102 may determine, based on the given value for 'number of DMRS CDM groups without data', whether to receive PDSCH on the resource elements allocated for other DMRS CDM groups on the DMRS symbol(s), which are not indicated by 'number of DMRS CDM groups without data'.

In an example of the implementation, the UE 102 may be configured with either of the RRC parameter dmrs-DownlinkForPDSCH-MappingTypeA and the RRC parameter dmrs-DownlinkForPDSCH-MappingTypeB. The first RRC parameter is applied to the configured RRC parameter. That is, the first RRC parameter is applied to the PDSCH mapping type indicated by the configured RRC parameter. The bitwidth of the antenna port field in the first DCI format is determined at least based on the total count of the one or more entries included in the first RRC parameter.

In an example of the implementation, the UE 102 may be configured with both the RRC parameter dmrs-DownlinkForPDSCH-MappingTypeA and RRC parameter dmrs-DownlinkForPDSCH-MappingTypeB. The first RRC parameter may be applied to both the PDSCH mapping A and the PDSCH mapping type B. That is, the first RRC parameter can be applied to both the PDSCH mapping type A and the PDSCH mapping type B. The bitwidth of the antenna port field in the first DCI format is determined at least based on the total count of the one or more entries included in the first RRC parameter.

In an example of the implementation, the UE 102 may be configured with both the RRC parameter dmrs-DownlinkForPDSCH-MappingTypeA and RRC parameter dmrs-DownlinkForPDSCH-MappingTypeB. The first RRC parameter may not be applied to both the PDSCH mapping A and the PDSCH mapping type B. The base station 160 may transmit, to the UE 102, different RRC parameters for PDSCH mapping type A and PDSCH mapping type B. To be specific, the base station 160 may transmit, to the UE 102, a second RRC parameter (e.g. antennaPortListforMappingTypeA) containing one or more entries where each entry at least provide a value for 'number of DMRS CDM groups without data' and one value for one DMRS port index among one or more DMRS port indexes. Meanwhile, the base station 160 may transmit, to the UE 102, a third RRC parameter (e.g. antennaPortListforMappingTypeB) containing one or more entries where each entry at least provide a value for 'number of DMRS CDM groups without data' and a value for one DMRS port index among one or more DMRS port indexes. The second RRC parameter is related to antenna port configuration for receiving a PDSCH with PDSCH mapping type A. The third RRC parameter is related to antenna port configuration for receiving a PDSCH with PDSCH mapping type B. Both the second RRC parameter and the third RRC parameter are applied to the first DCI format. The second RRC parameter and/or the third RRC parameter may be indicated in the broadcasted system information (e.g., MIB, SIB1, or other SIBs), or in a RRC message.

In the example of the implementation, the bitwidth of the antenna port field in a DCI format is determined at least based on the second RRC parameter and/or the third RRC parameter. Specifically, bitwidth of the antenna port field in a DCI format is determined at least based on a total count of one or more entries included in the second RRC parameter and a total count of one or more entries included in the third RRC parameter. The total count of the one or more entries in the second RRC parameter can be denoted as $N_A$, while the total count of the one or more entries in the third RRC parameter can be denoted as NB. For a scheduled PDSCH with PDSCH mapping type A, the UE 102 and/or the base station 160 may determine bitwidth of the antenna port field as $X_A=\text{ceiling}(\log_2(N_A))$ according to the second RRC parameter. On the other hand, for a scheduled PDSCH with PDSCH mapping type B, the UE 102 and/or the base station 160 may determine bitwidth of the antenna port field as $X_B=\text{ceiling}(\log_2(NB))$ according to the third RRC parameter. Therefore, in a case that the value of $N_A$ is different from that of $N_B$, the bitwidth of antenna port field determined based on $N_A$ may be different from that determined based on NB. A number of $|X_A-X_B|$ zeros are padded in the MSB of the antenna port field if the PDSCH mapping type of the scheduled PDSCH corresponds to a smaller value of $X_A$ and $X_B$. $|X_A-X_B|$ means to output an absolute value of $(X_A-X_B)$.

That is to say, in the example of the implementation, the base station and/or the UE 102 may determine the bitwidth of antenna port field in the first DCI format at least based on a larger one between $N_A$ and $N_B$, i.e. max$\{N_A, N_B\}$. The bitwidth of the antenna port field in the first DCI format may be determined as $\text{ceiling}(\log_2(\text{max}\{N_A, N_B\}))$ bits. The base station 160 may generate the antenna port field with ceiling $(\log_2(\text{max}\{N_A, N_B\}))$ bits in the first DCI format to the UE 102.

The UE 102 may receive, from the base station 160, a PDCCH with the first DCI format with the antenna port field. Upon detection of the PDCCH with the first DCI format, the UE 102 may receive a PDSCH scheduled by the first DCI format. According to the time domain resource assignment field in the first DCI format, the UE 102 may determine the PDSCH mapping type for the scheduled PDSCH. For the scheduled PDSCH with PDSCH mapping type A, the antenna port field value provides one entry of the one or more entries in the second RRC parameter. The entry indicated by the antenna port field value may provide a value for 'number of DMRS CDM groups without data' and a value for DMRS port index among one or more DMRS port indexes, which are used for UE 102 to receiving the scheduled PDSCH. For the scheduled PDSCH with PDSCH mapping type B, the antenna port field value provides an entry of the one or more entries in the third RRC parameter. The entry indicated by the antenna port field value may provide a value for 'number of DMRS CDM groups without data' and a value for DMRS port index among one or more DMRS port indexes, which are used for UE 102 to receiving the scheduled PDSCH. The UE 102 may receive the scheduled PDSCH based on the number of DMRS CDM groups without data and the DMRS port index associated to the indicated entry corresponding to the value indicated in the antenna port field.

In an example of the implementation, the UE 102 may be configured with either of the RRC parameter dmrs-DownlinkForPDSCH-MappingTypeA and the RRC parameter dmrs-DownlinkForPDSCH-MappingTypeB. The base station 160 may transmit, to the UE 102, different RRC parameters for PDSCH mapping type A and PDSCH mapping type B. In a case that the UE is configured with the RRC parameter dmrs-DownlinkForPDSCH-MappingTypeA, the base station 160 may also transmit, to the UE 102, the second RRC parameter (e.g. antennaPortListforMappingTypeA) containing one or more entries where each entry at least provide a value for 'number of DMRS CDM groups without data' and a value for DMRS port index among one or more DMRS port indexes. The second RRC parameter is related to antenna port configuration for receiving a PDSCH with PDSCH mapping type A. In this case, the bitwidth of the antenna port field in the first DCI format is determined at least based on a total count of the one or more entries included in the second RRC parameter.

In a case that the UE is configured with the RRC parameter dmrs-DownlinkForPDSCH-MappingTypeB, the base station 160 may also transmit, to the UE 102, the third RRC parameter (e.g. antennaPortListforMappingTypeA) containing one or more entries where each entry at least provide a value for 'number of DMRS CDM groups without data' and a value for DMRS port index. The third RRC parameter is related to antenna port configuration for receiving a PDSCH with PDSCH mapping type B. In this case, the bitwidth of the antenna port field in the first DCI format is determined at least based on a total count of the one or more entries included in the third RRC parameter.

Both the second RRC parameter and the third RRC parameter are applied to the first DCI format. The second RRC parameter and/or the third RRC parameter may be indicated in the broadcasted system information (e.g., MIB, SIB1, or other SIBs), or in a RRC message.

In the implementation of the present disclosure, the base station 160 may transmit RRC parameter(s) (e.g. the first RRC parameter, the second RRC parameter, and/or the third RRC parameter) to the UE 102 who only support one layer for downlink reception and/or are equipped with only 1 reception antenna. The base station 160 may not transmit RRC parameter(s) (e.g. the first RRC parameter, the second RRC parameter, and/or the third RRC parameter) to the UE 102 who can support more than one layer for downlink reception and/or are equipped with more than 1 reception antenna.

FIG. 11 is a flow diagram illustrating another implementation of a method 1100 for determining bitwidth of the antenna port field by a UE 102.

The UE 102 may be provided with a plurality of predefined antenna port tables. Each predefined table corresponds to one combination {DMRS configuration type, maxlength}. Therefore, the UE 102 may be provided with 4 predefined tables corresponding to different combinations {DMRS configuration type, maxlength}. These four predefined antenna port tables can be provided or defined in the specification [TS 38.212]. Different predefined antenna port tables may contain different numbers of entries. That is, The UE 102 may receive 1102, from a base station 160, a PDCCH with a first DCI format scheduling a PDSCH. According to the time domain resource assignment field in the first DCI format, the UE 102 may determine the PDSCH mapping type for the scheduled PDSCH.

The UE 102 may select 1104, from a plurality of predefined tables, a predefined table at least used for antenna port indication for the scheduled PDSCH. The UE 102 may select a predefined table depending on the DMRS configuration(s) which are applied to the first DCI format. To be specific, the UE 102 may select a predefined table corresponding to the combination {DMRS configuration type, maxlength} which are configured for the PDSCH mapping type of the scheduled PDSCH. One predefined table at least contains one or more entries where each entry provides a value for number of DMRS CDM groups without data and value(s) for DMRS port index(es). The one or more entries includes at least first entries where each of the first entries indicates one value for one DMRS port index among one or more DMRS port indexes.

The UE 102 may determine 1106, a bitwidth of antenna port field in the first DCI format at least based on a total count of the first entries. The total count of the first entries can be denoted as N. The UE 102 and/or the base station 160 may determine the bitwidth of the antenna port field in the DCI format as ceiling($\log_2(N)$) bits. The base station 160 may generate the antenna port field with ceiling($\log_2(N)$) bits in the first DCI format to the UE 102. The base station 160 may determine an entry from the first entries and use the value of the antenna port field in the DCI format to indicate the determined first entry. That is, a value of the antenna port field indicates one of the first entries. The base station 160 may use the value of the antenna port field in the first DCI format to indicate which entry in the first entries is used for reception of the scheduled PDSCH. The value k of antenna port field in the first DCI format indicates (corresponds to) the (k+1)th entry in the first entries.

In other words, the base station 160 may transmit a corresponding PDSCH scheduled by the first DCI format to the UE 102 at least based on the number of DMRS CDM groups without data and the DMRS port index provided by a first entry indicated by the value of antenna port field in the first DCI format. The UE 102 may receive 1108, from the base station 160, the PDSCH based on the number of DMRS CDM groups without data and the DMRS port index associated to a first entry corresponding to a value indicated in the antenna port field.

In an example of the implementation, the predefined table(s) may only contain the first entries and zero, one or more reserved entries. As above-mentioned, each entry in a predefined table may provide a value for an index of the entry in the table, a value for number of DMRS CDM groups without data, and value(s) for DMRS port index(es). Each entry of the first entries indicates one value for one DMRS port index among one or more DMRS port indexes. However, for those reserved entries, the value for number of DMRS CDM groups without data is set to 'reserved' and value(s) for DMRS port index(es) are set to 'reserved' as well. The bitwidth of antenna port field in the first DCI format may be determined based on a total count of the first entries. Additionally or alternatively, the bitwidth of antenna port field in the first DCI format may be determined based on a total count of entries of the predefined table. In other words, the bitwidth of the antenna port field in the first DCI format is defined by the corresponding predefined table.

In the example of the implementation, the predefined table(s) may not contain one or more second entries where each of the one or more second entries indicates a plurality of values for a plurality of DMRS port indexes among the one or more DMRS port indexes. Therefore, these pre-defined tables in the present disclosure can be different from those existing predefined tables in the specification [TS 38.212] which contain the second entries. The bitwidth of antenna port field defined by these predefined tables in the present disclosure can be smaller than that defined by existing predefined tables in the specification [TS 38.212], which leads to a better PDCCH reception performance.

In an example of the implementation, the predefined table(s) may contain the first entries and zero, one or more reserved entries. Furthermore, the predefined table(s) may further contain one or more second entries where each of the one or more second entries indicates a plurality of values for a plurality of DMRS port indexes among the one or more DMRS port indexes. That is, the predefined table(s) may contain one or more first entries, one or more second entries, and zero, one or more reserved entries. Each of all entries in the first entries indicates one value for one DMRS port index among one or more DMRS port indexes. Each of all entries in the second entries indicates a plurality of values for a plurality of DMRS port indexes among one or more DMRS port indexes.

The predefined tables in the present disclosure can be those existing predefined tables in the specification [TS 38.212]. However, the bitwidth of antenna port field in the first DCI format may not be determined based on a total count of entries of the predefined table. The bitwidth of antenna port field in the first DCI format is determined at least based on a total count of entries of the first entries. In other words, the bitwidth of antenna port field in the first DCI format is not defined by the corresponding predefined table. The bitwidth of antenna port field in the first DCI format is defined by the first entries in the corresponding predefined table.

In the implementation of the present disclosure, as above-mentioned, the UE 102 needs to select a predefined table from a plurality of predefined tables according to the DMRS configuration (i.e. combination {DMRS configuration type, maxlength}) applied to the first DCI format. In the present disclosure, both two DMRS configurations, i.e. dmrs-DownlinkForPDSCH-MappingTypeA and dmrs-DownlinkForPDSCH-MappingTypeB, can be simultaneously configured to the first DCI format. That is, two DMRS configurations can be simultaneously applied to the first DCI format. The different DMRS configurations (i.e. different combinations {DMRS configuration type, maxlength}) correspond to different predefined tables. Naturally, the bit-width of antenna port field in the first DCI format derived according to different configured DMRS configurations would be different. In this case, a larger bitwidth of antenna port field can be determined as the bitwidth of the antenna port field in the first DCI format.

In this case, for example, bitwidth of antenna port field derived based on first entries in a predefined table corre-sponding to dmrs-DownlinkForPDSCH-MappingTypeA is denoted as $X_A$. Bitwidth of antenna port field derived based on first entries in another predefined table corresponding to dmrs-DownlinkForPDSCH-MappingTypeB is denoted as $X_B$. The larger value of $X_A$ and $X_B$ is determined as the bitwidth of the antenna port field in the first DCI format. For a PDSCH mapping type corresponding to a smaller value of $X_A$ and $X_B$, a number of $|X_A-X_B|$ zeros are padded in the MSB of the antenna port field.

In various implementations of the present disclosure, a RRC parameter may be configured by the base station 160 to indicate the UE 102 whether antenna port field is present or absent in the first DCI format. In a case that the RRC parameter indicates the antenna port field in the first DCI format is present, the UE 102/the base station 160 may then determine the bitwidth of the antenna port field in the first DCI format according to methods in above-mentioned implementations. In a case that RRC parameter indicates the antenna port field in the first DCI format is absent, the UE 102/the base station 160 may then determine the bitwidth of the antenna port field as 0 bit.

In various implementations of the present disclosure, the first DCI format can be the DCI format 1_1. Additionally or alternatively, the first DCI format can be the DCI format 1_2. As above-mentioned, the RRC parameters dmrs-Down-linkForPDSCH-MappingTypeA and dmrs-Downlink-ForPDSCH-MappingTypeB are configured and applied to the DCI format 1_1. On the other hand, the RRC parameters dmrs-DownlinkForPDSCH-MappingTypeA-DCI-1-2 and dmrs-DownlinkForPDSCH-MappingTypeB-DCI-1-2 are configured and applied to the DCI format 1_2. The antenna port field determination for DCI format 1_1 in above-mentioned various implementations can equally apply to that for DCI format 1_2 by applying dmrs-Downlink-ForPDSCH-MappingTypeA-DCI-1-2 and/or dmrs-Down-linkForPDSCH-MappingTypeB-DCI-1-2 instead of dmrs-DownlinkForPDSCH-MappingTypeA and/or dmrs-DownlinkForPDSCH-MappingTypeA, respectively.

Figure 12:
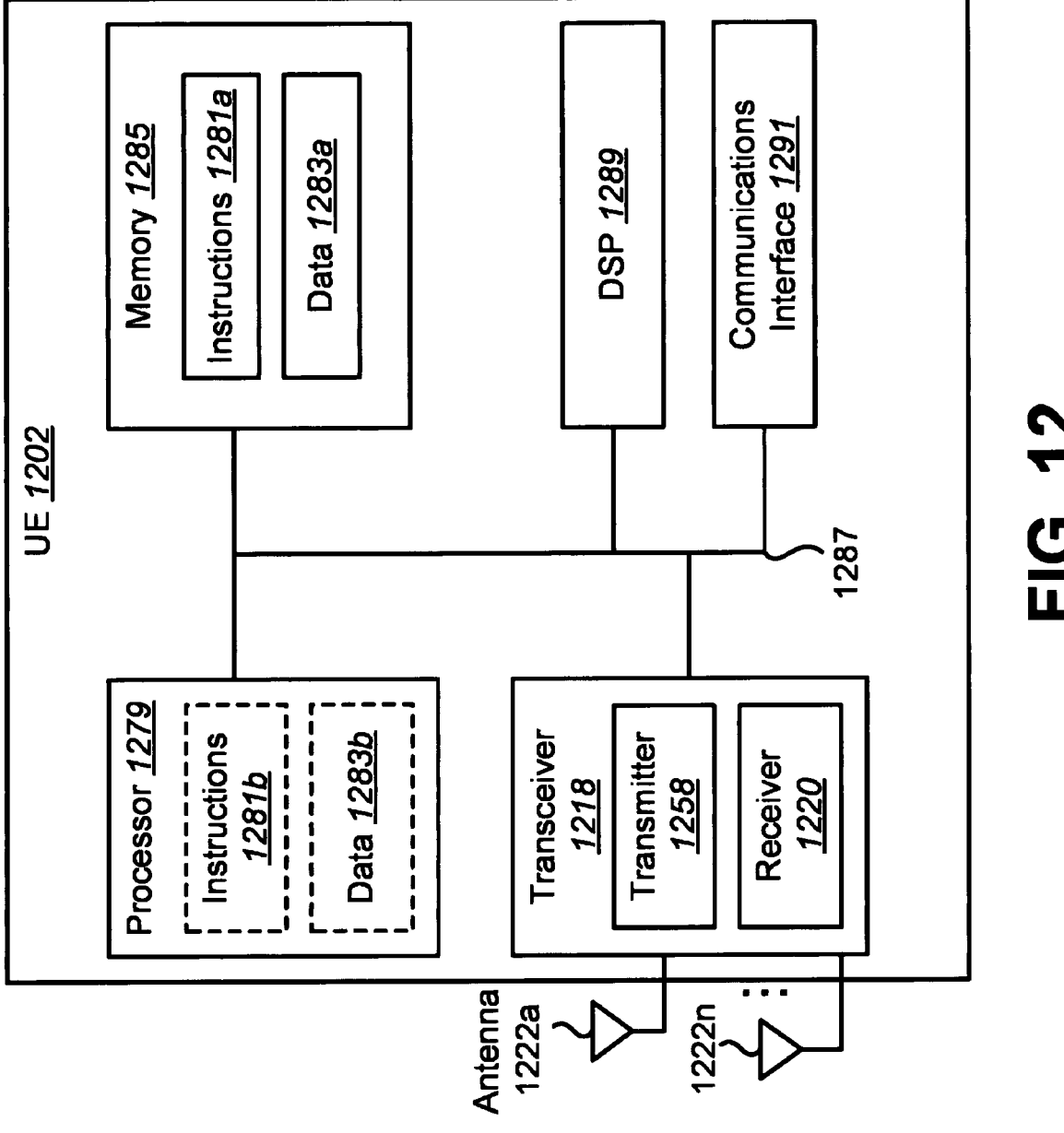
FIG. 12 illustrates various components that may be utilized in a UE.

FIG. 12 illustrates various components that may be uti-lized in a UE 1202. The UE 1202 (i.e. the UE 102) described in connection with FIG. 12 may be implemented in accor-dance with the UE 102 described in connection with FIG. 1. The UE 1202 includes a processor 1281 that controls operation of the UE 1202. The processor 1281 may also be referred to as a central processing unit (CPU). Memory 1287, which may include read-only memory (ROM), ran-dom access memory (RAM), a combination of the two or any type of device that may store information, provides instructions 1283a and data 1285a to the processor 1281. A portion of the memory 1287 may also include non-volatile random access memory (NVRAM). Instructions 1283b and data 1285b may also reside in the processor 1281. Instruc-tions 1283b and/or data 1285b loaded into the processor 1281 may also include instructions 1283a and/or data 1285a from memory 1287 that were loaded for execution or processing by the processor 1281. The instructions 1283b may be executed by the processor 1281 to implement one or more of the methods 200 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222a-n are attached to the housing and electrically coupled to the transceiver 1218.

The various components of the UE 1202 are coupled together by a bus system 1289, which may include a power bus, a control signal bus and a status signal bus, in addition to a data bus. However, for the sake of clarity, the various buses are illustrated in FIG. 12 as the bus system 1289. The UE 1202 may also include a digital signal processor (DSP) 1291 for use in processing signals. The UE 1202 may also include a communications interface 1293 that provides user access to the functions of the UE 1202. The UE 1202 illustrated in FIG. 12 is a functional block diagram rather than a listing of specific components.

Figure 13:
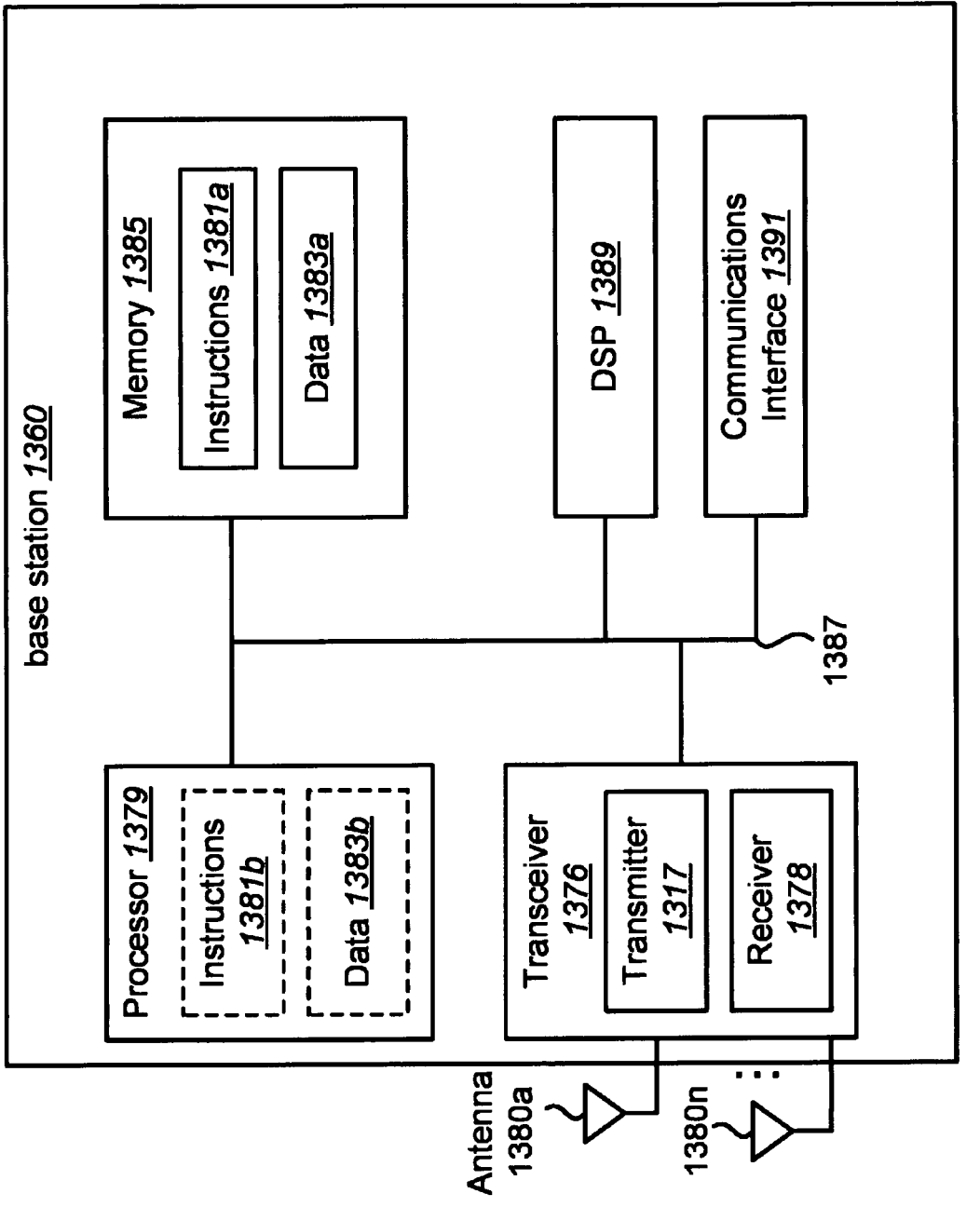
FIG. 13 illustrates various components that may be utilized in a base station.

FIG. 13 illustrates various components that may be utilized in a base station 1360. The base station 1360 (i.e. the base station 160) described in connection with FIG. 13 may be implemented in accordance with the base station 160 described in connection with FIG. 1. The base station 1360 includes a processor 1381 that controls operation of the base station 1360. The processor 1381 may also be referred to as a central processing unit (CPU). Memory 1387, which may include read-only memory (ROM), random access memory (RAM), a combination of the two or any type of device that may store information, provides instructions 1383a and data 1385a to the processor 1381. A portion of the memory 1387 may also include non-volatile random access memory (NVRAM). Instructions 1383b and data 1385b may also reside in the processor 1381. Instructions 1383b and/or data 1385b loaded into the processor 1381 may also include instructions 1383a and/or data 1385a from memory 1387 that were loaded for execution or processing by the processor 1381. The instructions 1383b may be executed by the processor 1381 to implement one or more of the methods 300 described above.

The base station 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380a-n are attached to the housing and electrically coupled to the transceiver 1376.

The various components of the base station 1360 are coupled together by a bus system 1389, which may include a power bus, a control signal bus and a status signal bus, in addition to a data bus. However, for the sake of clarity, the various buses are illustrated in FIG. 13 as the bus system 1389. The base station 1360 may also include a digital signal processor (DSP) 1391 for use in processing signals. The base station 1360 may also include a communications interface 1393 that provides user access to the functions of the base station 1360. The base station 1360 illustrated in FIG. 13 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:
reception circuitry configured to:
    receive, from a base station, a first radio resource control (RRC) parameter including one or more entries, and
    receive, from the base station, a downlink control information (DCI) format with an antenna port field, a value of the antenna port field indicating one of the one or more entries included in the first RRC parameter; and
control circuitry configured to determine a bitwidth of the antenna port field in the DCI format, at least, based on a total number of the one or more entries included in the first RRC parameter, wherein:
    each entry in the one or more entries provides, at least:
        a value for 'number of demodulation reference signal (DMRS) code division multiplexing (CDM) groups without data', and
        one value for one DMRS port index among one or more DMRS port indexes,
    the bitwidth of the antenna port field is determined as ceiling (log 2(N)), wherein the N is the total number of the one or more entries included in the first RRC parameter, and
    the first RRC parameter is commonly applied in a case that the UE is configured with both a DMRS for a physical downlink shared channel mapping type A (dmrs-DownlinkForPDSCH-MappingTypeA) and a DMRS for a physical downlink shared channel mapping type B (dmrs-DownlinkForPDSCH-Mapping-TypeB).

2. The UE according to claim 1, wherein
a value k indicated in the antenna port field in the DCI format corresponds to a (k+1)th entry of the one or more entries.

3. A base station, comprising:
transmission circuitry configured to;
    transmit, to a user equipment (UE), a first radio resource control (RRC) parameter including one or more entries; and
    transmit, to the UE, a downlink control information (DCI) format with an antenna port field, a value of the antenna port field indicating one of the one or more entries included in the first RRC parameter; and
control circuitry configured to determine a bitwidth of the antenna port field in the DCI format, at least, based on a total number of the one or more entries included in the first RRC parameter, wherein;

each entry in the one or more entries provides, at least:
  a value for 'number of demodulation reference signal (DMRS) code division multiplexing (CDM) groups without data', and
  one value for one DMRS port index among one or more DMRS port indexes,
the bitwidth of the antenna port field is determined as ceiling (log 2(N)), wherein the N is the total number of the one or more entries included in the first RRC parameter, and
the first RRC parameter is commonly applied in a case that the UE is configured with both a DMRS for a physical downlink shared channel mapping type A (dmrs-DownlinkForPDSCH-MappingTypeA) and a DMRS for a physical downlink shared channel mapping type B (dmrs-DownlinkForPDSCH-Mapping-TypeB).

4. The base station according to claim 3, wherein
a value k indicated in the antenna port field in the DCI format corresponds to a (k+1)th entry of the one or more entries.

5. A method performed by a base station, the method comprising:
transmitting, to a user equipment (UE), a first radio resource control (RRC) parameter including one or more entries;

transmitting, to the UE, a downlink control information (DCI) format with an antenna port field, a value of the antenna port field indicating one of the one or more entries included in the first RRC parameter; and
determining a bitwidth of the antenna port field in the DCI format, at least, based on a total number of the one or more entries included in the first RRC parameter, wherein:
  each entry in the one or more entries provides, at least:
    a value for 'number of demodulation reference signal (DMRS) code division multiplexing (CDM) groups without data', and
    one value for one DMRS port index among one or more DMRS port indexes,
  the bitwidth of the antenna port field is determined as ceiling (log 2(N)), wherein the N is the total number of the one or more entries included in the first RRC parameter, and
  the first RRC parameter is commonly applied in a case that the UE is configured with both a DMRS for a physical downlink shared channel mapping type A (dmrs-DownlinkForPDSCH-MappingTypeA) and a DMRS for a physical downlink shared channel mapping type B (dmrs-DownlinkForPDSCH-Mapping-TypeB).

* * * * *